(12) United States Patent
Park et al.

(10) Patent No.: US 10,466,897 B2
(45) Date of Patent: Nov. 5, 2019

(54) MOBILE TERMINAL FOR USING MULTIMODAL VIRTUAL KEYBOARD AND CONTROLLING METHOD THEREOF

(71) Applicant: LG ELECTRONICS INC., Seoul (KR)

(72) Inventors: Sangouk Park, Seoul (KR); Youngmin Yoon, Seoul (KR); Hyunjoo Jeon, Seoul (KR); Bumhee Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 14/583,879

(22) Filed: Dec. 29, 2014

(65) Prior Publication Data

US 2015/0331605 A1 Nov. 19, 2015

(30) Foreign Application Priority Data

May 16, 2014 (KR) .................. 10-2014-0059165

(51) Int. Cl.
*G06F 3/0488* (2013.01)
*G06F 3/0482* (2013.01)
(Continued)

(52) U.S. Cl.
CPC ........ *G06F 3/04886* (2013.01); *G06F 3/0482* (2013.01); *G06F 3/04842* (2013.01); *G06F 3/04892* (2013.01); *G06F 17/24* (2013.01); *G06F 3/0412* (2013.01); *G06F 3/0416* (2013.01); *G06F 17/276* (2013.01);
(Continued)

(58) Field of Classification Search
CPC .... G06F 3/0236; G06F 3/0237; G06F 3/0488; G06F 3/04883; G06F 3/04886; G06F 3/04842; G06F 3/04892; G06F 3/0482; G06F 17/276; G06F 17/24; G06F 3/0412; G06F 3/0416; H04M 2250/70
See application file for complete search history.

(56) References Cited

U.S. PATENT DOCUMENTS 6,396,520 B1 * 5/2002 Ording ................. G06F 3/0481
715/781
7,536,650 B1 * 5/2009 Robertson ............. G06F 3/0481
715/764
(Continued)

FOREIGN PATENT DOCUMENTS

CN 102265586 A 11/2011
CN 102405456 A 4/2012
(Continued)

*Primary Examiner* — Justin R. Blaufeld
(74) *Attorney, Agent, or Firm* — Birch, Stewart, Kolasch & Birch, LLP

(57) ABSTRACT

A mobile terminal including a wireless communication configured to provide wireless communication; a touch screen; and a controller configured to display on the touch screen an input region including a plurality of character keys and a plurality of editing keys and an output region, display on the touch screen an editing state display region between the input region and the output region and for displaying a word corresponding to touched character keys, select or edit the word displayed in the editing state display region based on a touch input applied to the input region, and display the selected or edited word on the output region.

14 Claims, 32 Drawing Sheets

(51) Int. Cl.
   *G06F 17/24*     (2006.01)
   *G06F 3/0484*    (2013.01)
   *G06F 3/0489*    (2013.01)
   *G06F 3/041*         (2006.01)
   *G06F 17/27*         (2006.01)
(52) U.S. Cl.
   CPC ............ *G06F 2203/04803* (2013.01); *G06F 2203/04804* (2013.01)

(56) References Cited

U.S. PATENT DOCUMENTS

| | | | |
|---|---|---|---|
| 8,584,049 B1 | 11/2013 | Zhai et al. | |
| 8,904,309 B1 * | 12/2014 | Zhai .................. | G06F 3/0482 715/773 |
| 2005/0275632 A1 * | 12/2005 | Pu ..................... | G01C 21/3611 345/171 |
| 2005/0275633 A1 * | 12/2005 | Varanda ............. | G06F 3/0481 345/173 |
| 2005/0275636 A1 * | 12/2005 | Dehlin ............... | G06F 3/011 345/173 |
| 2008/0168366 A1 * | 7/2008 | Kocienda ........... | G06F 3/0237 715/764 |
| 2008/0266263 A1 * | 10/2008 | Motaparti ........... | G06F 3/0237 345/169 |
| 2008/0316183 A1 * | 12/2008 | Westerman ......... | G06F 3/0416 345/173 |
| 2010/0123724 A1 * | 5/2010 | Moore ................ | G06F 3/04817 345/473 |
| 2010/0287486 A1 * | 11/2010 | Coddington ........ | G06F 3/0236 715/769 |
| 2011/0291940 A1 * | 12/2011 | Ghassabian ......... | G06F 1/1626 345/169 |
| 2012/0092278 A1 * | 4/2012 | Yamano .............. | G06F 3/04886 345/173 |
| 2012/0117505 A1 * | 5/2012 | Koch .................. | G06F 3/04886 715/773 |
| 2012/0117506 A1 * | 5/2012 | Koch .................. | G06F 3/04886 715/773 |
| 2013/0036387 A1 * | 2/2013 | Murata ............... | G06F 3/04883 715/841 |
| 2013/0046544 A1 * | 2/2013 | Kay .................... | G06F 3/04883 704/275 |
| 2013/0067411 A1 * | 3/2013 | Kataoka .............. | G06F 3/04883 715/835 |
| 2013/0104068 A1 * | 4/2013 | Murphy .............. | G06F 3/0237 715/773 |
| 2013/0113717 A1 * | 5/2013 | Van Eerd ............ | G06F 3/04883 345/173 |
| 2013/0187868 A1 * | 7/2013 | Griffin ................ | G06F 3/04886 345/173 |
| 2013/0249809 A1 * | 9/2013 | Kawalkar ............ | G06F 3/016 345/173 |
| 2013/0285927 A1 * | 10/2013 | Pasquero ............ | G06F 3/0237 345/173 |
| 2014/0063067 A1 * | 3/2014 | Compton ............ | G06F 3/0237 345/660 |
| 2014/0098023 A1 * | 4/2014 | Zhai ................... | G06F 3/0237 345/168 |
| 2014/0108992 A1 * | 4/2014 | Bi ....................... | G06F 17/276 715/773 |
| 2014/0109016 A1 * | 4/2014 | Ouyang .............. | G06F 17/24 715/856 |
| 2014/0179283 A1 * | 6/2014 | Kwon ................. | H04W 4/16 455/414.1 |
| 2014/0218297 A1 * | 8/2014 | Mortel ................ | G06F 3/0233 345/168 |
| 2014/0267056 A1 * | 9/2014 | Pasquero ............ | G06F 3/0237 345/169 |
| 2014/0317547 A1 * | 10/2014 | Bi ....................... | G06F 3/0482 715/773 |
| 2015/0347379 A1 * | 12/2015 | Chaudhri ........... | G06F 3/04842 715/773 |
| 2016/0328147 A1 * | 11/2016 | Zhang ................. | G06F 3/0237 |

FOREIGN PATENT DOCUMENTS

| | | | | |
|---|---|---|---|---|
| CN | 103403663 A | 11/2013 | | |
| CN | 103729136 A | 4/2014 | | |
| CN | 108334262 A | 7/2018 | | |
| EP | 2 703 957 A1 | 3/2014 | | |
| EP | 2703957 A9 | 5/2014 | | |
| JP | WO 2010035574 A1 * | 4/2010 | .......... | G06F 3/0237 |
| WO | WO 2007/037808 A1 | 4/2007 | | |

* cited by examiner

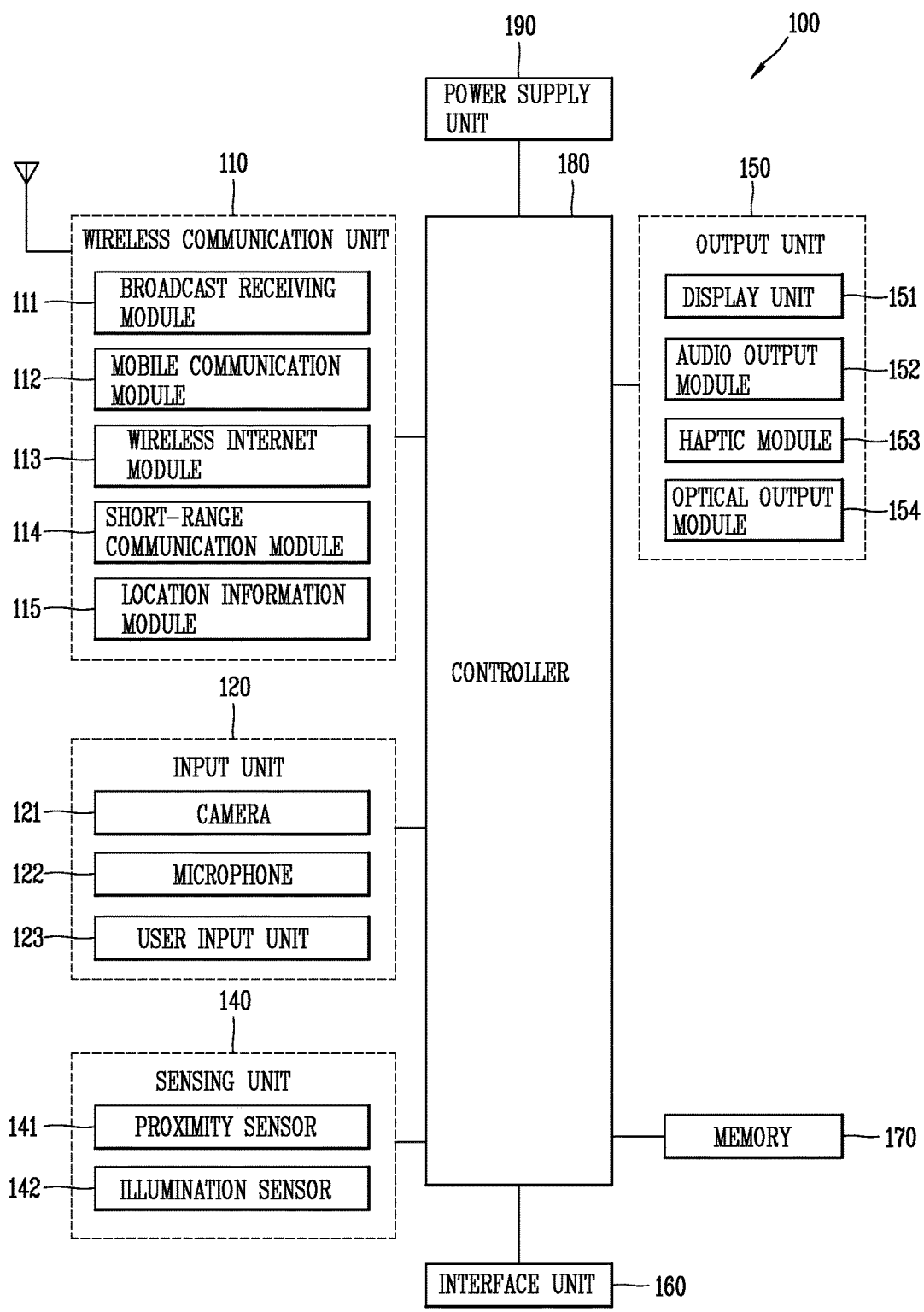

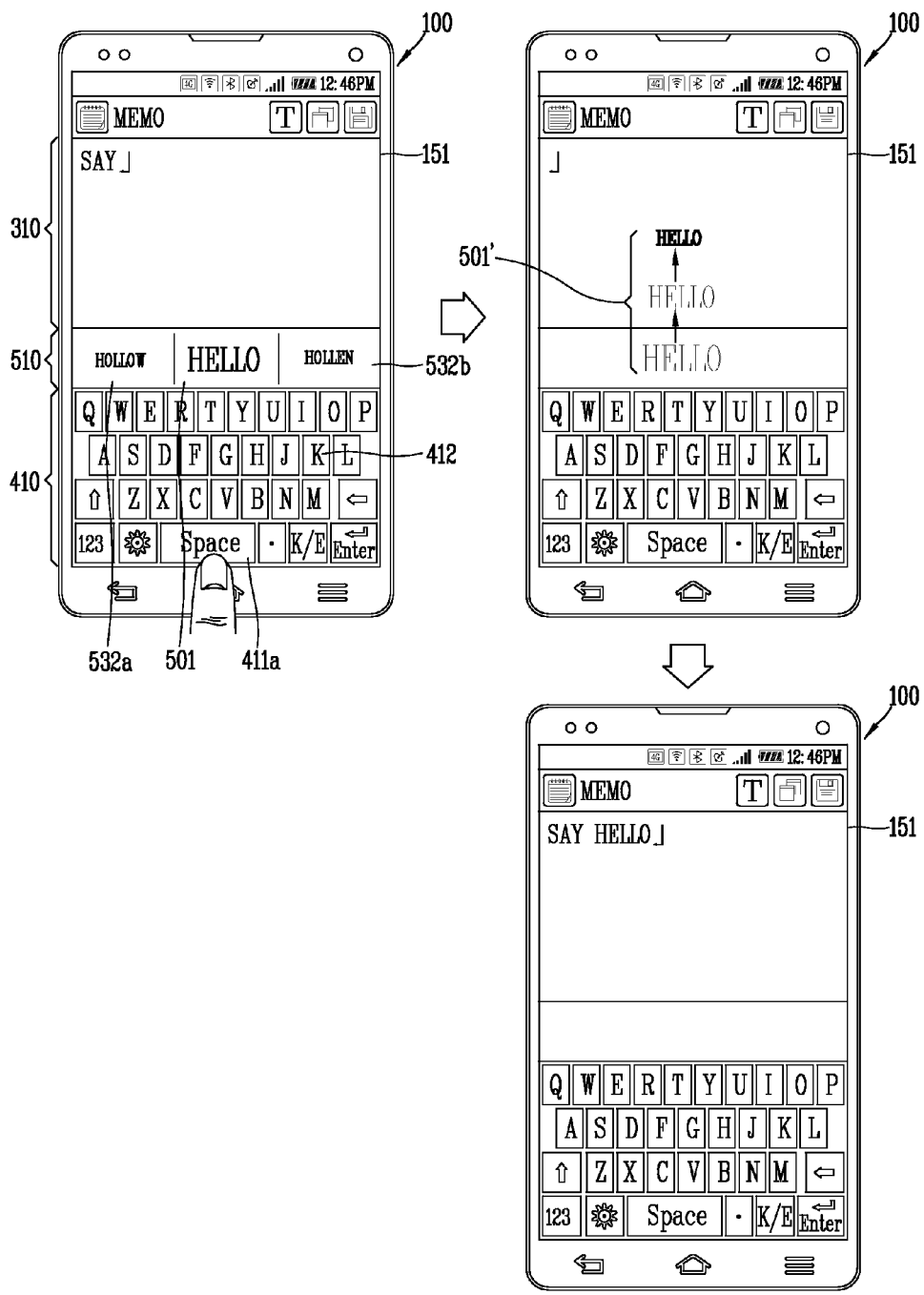

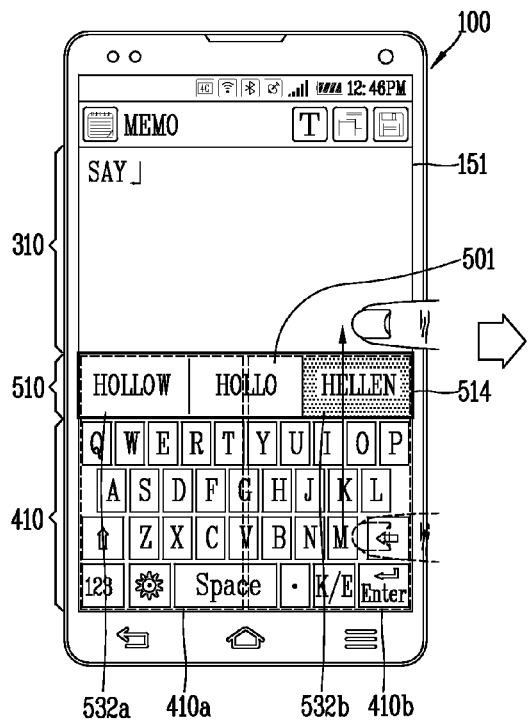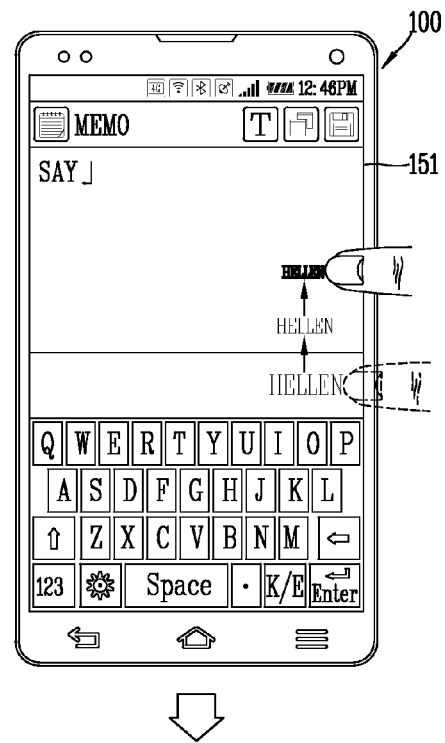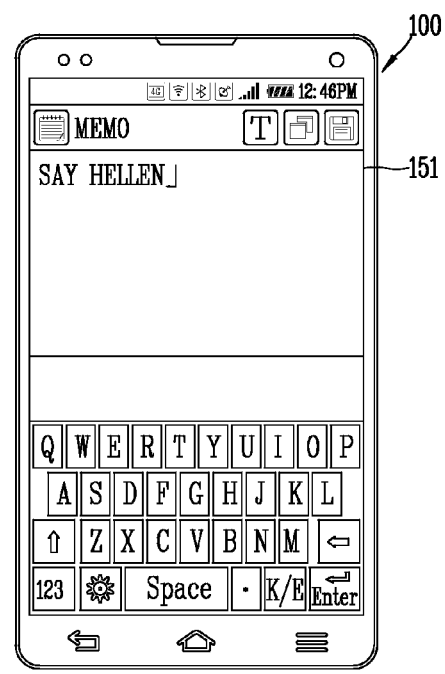

MOBILE TERMINAL FOR USING MULTIMODAL VIRTUAL KEYBOARD AND CONTROLLING METHOD THEREOF

CROSS-REFERENCE TO RELATED APPLICATION

Pursuant to 35 U.S.C. § 119(a), this application claims the benefit of earlier filing date and right of priority to Korean Application No. 10-2014-0059165, filed in Republic of Korea on May 16, 2014, the contents of which are incorporated by reference herein in their entirety.

BACKGROUND OF THE INVENTION

1. Field of the Invention

The present invention relates to a mobile terminal including a display unit and corresponding method for outputting characters by a touch input.

2. Background of the Invention

Terminals may be generally classified as mobile/portable terminals or stationary terminals. Mobile terminals may also be classified as handheld terminals or vehicle mounted terminals.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Mobile terminals include a touch sensor for receiving a touch input and output a virtual keyboard having a plurality of keys to a region of a display unit. When a touch input is applied to a virtual keyboard, a character is output to a region differentiated from the virtual keyboard. In this instance, the user has to check an output region in which a character is output, in order to check the character while applying a touch input to the virtual keyboard, causing inconvenience to the user.

SUMMARY OF THE INVENTION

Therefore, an aspect of the detailed description is to provide a display unit allowing a user to input a character when applying a touch input to a virtual keyboard without moving his or her eyes to check an output region.

To achieve these and other advantages and in accordance with the purpose of this specification, as embodied and broadly described herein, the present invention provides a mobile terminal includes: a touch screen including an input region including a plurality of character keys and a plurality of editing keys and an output region; and a control unit configured to output an editing state display region including a word corresponding to character keys based on touch inputs applied to the character keys, between the input region and the output region, wherein, based on a touch input applied to the input region, the control unit selects or edits the word in the editing state display region, and controls the touch screen to display the selected word or the edited word on the output region.

In another aspect, the present invention provides a method for controlling a mobile terminal including a touch screen divided into an output region and an input region including a plurality of character keys and a plurality of editing keys. The method includes outputting a word to an editing state display region between the input region and the output region based on a touch input applied to the character keys; editing or selecting the word in the editing state display region based on a touch input applied to a portion of the plurality of character keys; and displaying the word to the output region based on a touch input applied to a portion of the plurality of character keys.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 1A is a block diagram of a mobile terminal according to an embodiment of the present invention.

FIGS. 7A through 7E(d) are conceptual views illustrating a control method of inputting a word to an input region.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
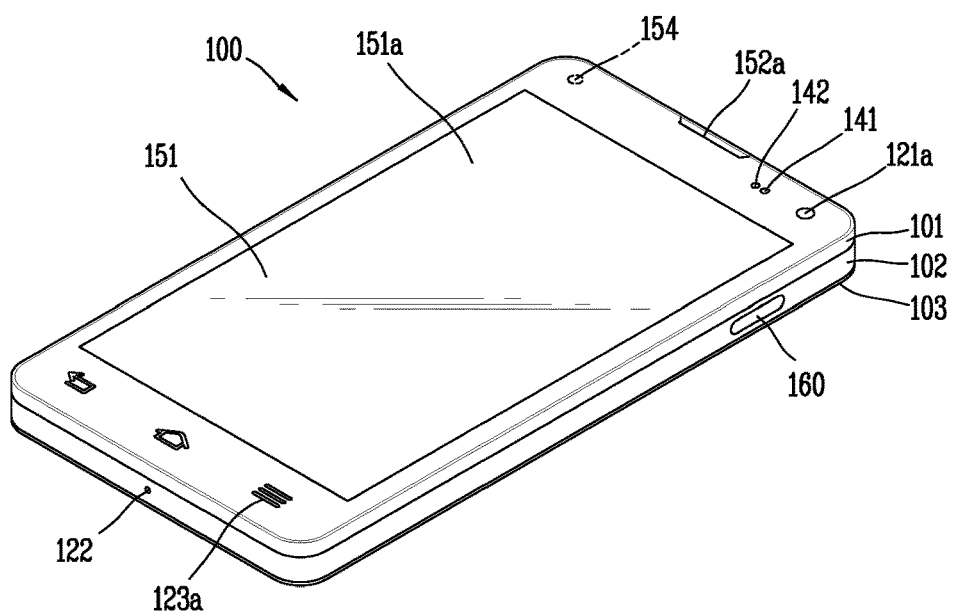
FIGS. 1B and 1C are conceptual views of one example of the mobile terminal, viewed from different directions.
Figure 1C:
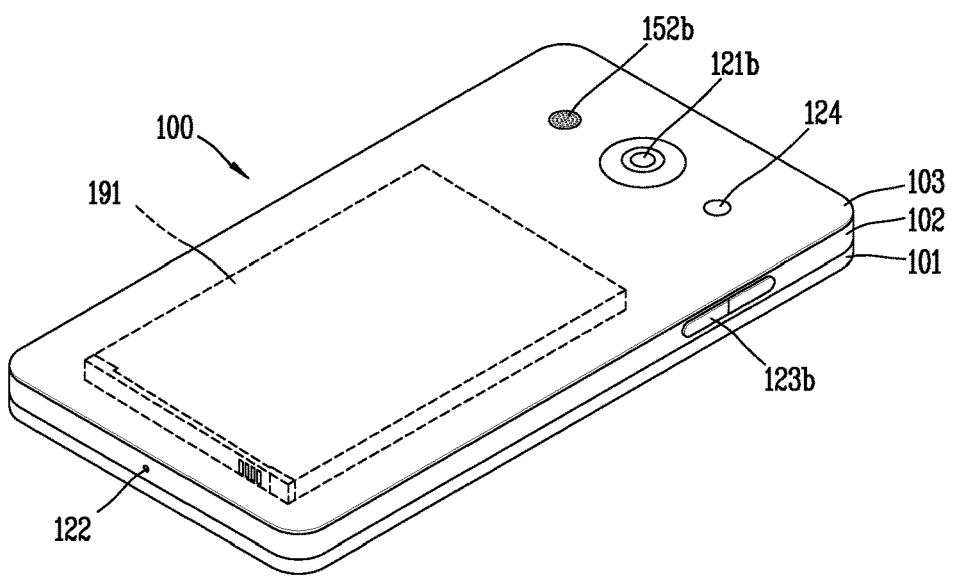

Reference is now made to FIGS. 1A-1C, where FIG. 1A is a block diagram of a mobile terminal in accordance with the present invention, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output unit 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, combined with the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output unit 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output unit 152 can provide audible output related to a particular function (e.g., a call signal reception sound, a message reception sound, etc.) performed by the mobile terminal 100. The audio output unit 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters (or word) or images, respectively. In addition, the controller 180 can control one or a combination of those components in order to implement various embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port.

In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output unit 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, first and second audio output units 152a and 152b, the proximity sensor 141, an illumination sensor 142, a optical output module 154, first and second cameras 121a and 121b, first and second manipulation units 123a and 123b, a microphone 122, an interface unit 160, and the like.

Hereinafter, as illustrated in FIGS. 1B and 1C, the mobile terminal 100 in which the display unit 151, the first audio output unit 152a, the proximity sensor 141, the illumination sensor 142, the optical output module 154, the first camera 121a, and the first manipulation unit 123a are disposed on a front surface of the terminal body, the second manipulation unit 123b, the microphone 122, and the interface unit 160 are disposed on the side of the terminal body, and the second audio output unit 152b and the second camera 121b are disposed on a rear surface of the terminal body will be described as an example.

However, the components are not limited to the configuration. The components may be excluded, replaced, or disposed on other surfaces as needed. For example, the first manipulation unit 123a may not be provided on the front surface of the terminal body, and the second audio output unit 152b may be provided on the side of the terminal body, rather than on the rear surface of the terminal body.

The display unit 151 may display (or output) information processed in the mobile terminal 100. For example, the display unit 151 may display executed screen information of an application program driven in the mobile terminal 100, or user interface (UI) information or graphic user interface (GUI) information according to the executed screen information.

The display unit 151 may include a liquid crystal display (LCD), a thin film transistor-liquid crystal display (TFT-LCD), an organic light emitting diode (OLED), a flexible display, a 3-dimensional (3D) display, and an e-ink display. The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver and the second audio output unit 152b may be implemented in the form of a loud speaker to output voice audio, alarm sounds, multimedia audio reproduction, and the like.

The window 151a of the display unit 151 will typically include an aperture to permit audio generated by the first audio output unit 152a to pass. One alternative is to allow audio to be released along an assembly gap between the structural bodies (for example, a gap between the window 151a and the front case 101). In this instance, a hole independently fornied to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the control unit can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output units 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output units 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. However, the present invention is not limited thereto and a position of the rear input unit may be modified.

When the rear input unit is provided on the rear surface of the terminal body, a new user interface may be implemented. Also, when the touch screen or the rear input unit as described above replaces at least some functions of the first manipulation unit 123a provided on the front surface of the terminal body so the first manipulation unit 123a is omitted from the front surface of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output unit 152b can be located on the terminal body. The second audio output unit 152b may implement stereophonic sound functions in conjunction with the first audio output unit 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear cover 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal 100 according to an embodiment of the present invention includes a function of inputting a word based on a touch input applied to the display unit 151. In an embodiment of the present invention, while a user is inputting characters (word) by applying a touch input to a region of the display unit 151, an editing state of a word input to be adjacent to the particular region to which the touch is applied is displayed. Hereinafter, a control method of outputting an editing state display region according to various embodiments of the present invention will be described. The display unit is implemented as a touch screen which receives a touch input to control a mobile terminal. Thus, hereinafter, reference numeral 151 will be given to a touch screen and described.

Figure 2:
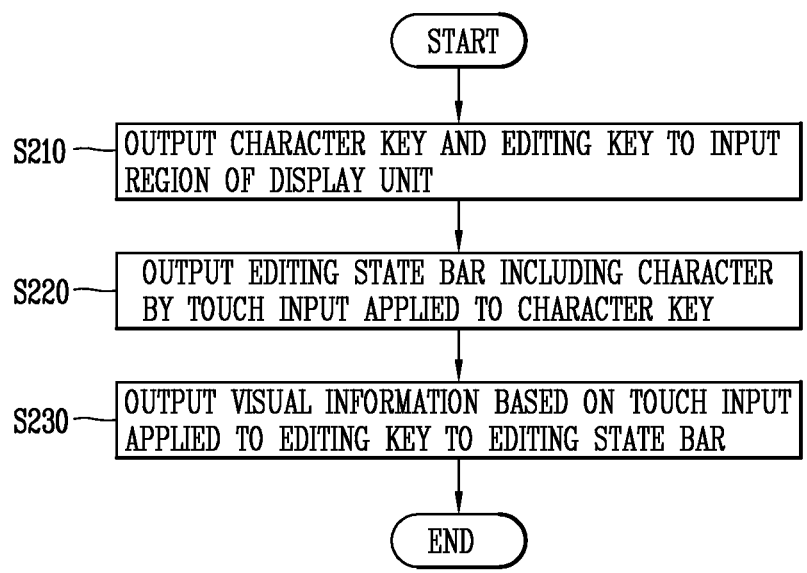
FIG. 2 is a flow chart illustrating a control method according to an embodiment of the present invention.
Figure 3A:
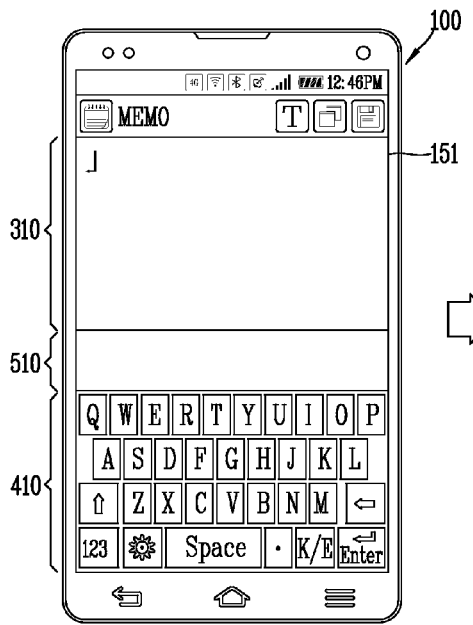
FIGS. 3A(a) to 3B(c) are conceptual views illustrating a control method of FIG. 2.
Figure 3A:
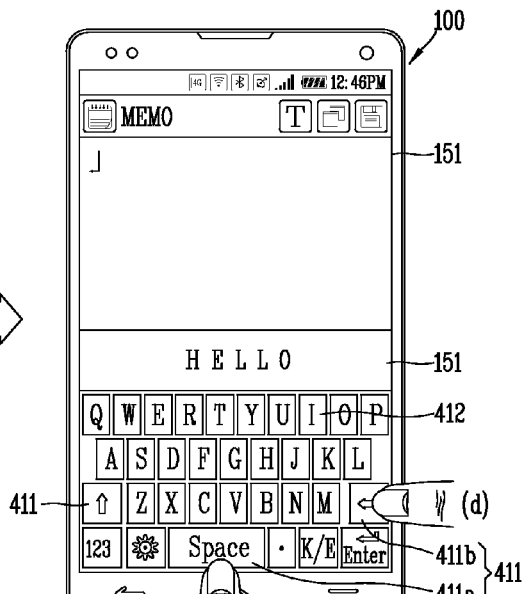
Figure 3A:
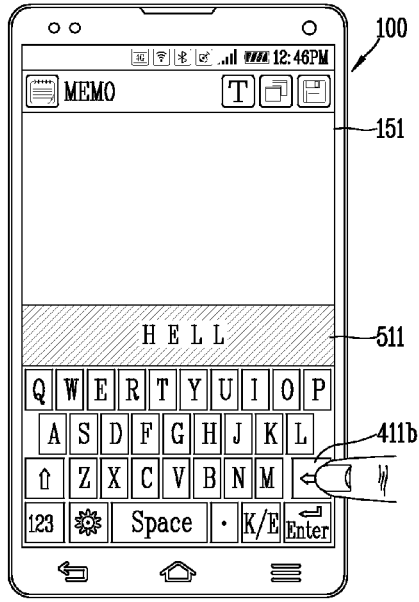
Figure 3A:
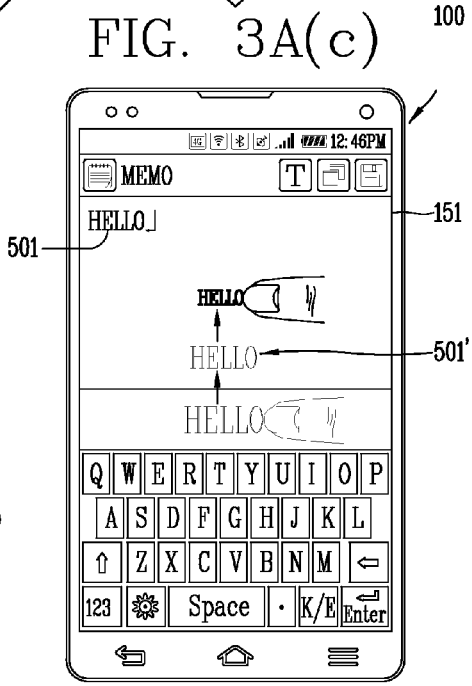

In particular, FIG. 2 is a flow chart illustrating a control method according to an embodiment of the present invention, and FIGS. 3A(a) through 3B(c) are conceptual views illustrating a control method of FIG. 2. Referring to FIGS. 2 and 3A, the touch screen 151 includes an output region 310 and an input region 410. For example, when a memo application allowing for inputting and storing content such as a word, an image, and the like, is executed, the input region 410 may be implemented as a virtual keyboard. The virtual keyboard may include a plurality of touch keys. The virtual keyboard 410 may include a plurality of character keys 412 corresponding to a plurality of inputtable characters and a plurality of editing keys 411 receiving a touch input for controlling editing such as deleting a word, changing a line, spacing, changing a language of a character, and the like. That is, the controller 180 displays a plurality of editing keys 411 and a plurality of character keys 412 to an input region 410 of the touch screen 151 in step S210.

A word (characters) based on a touch input applied to the character key 412 of the virtual keyboard 410, and the like, may be output to the output region 310. Based on a touch input applied to the character key 412, the controller 180 can control the touch screen 151 to output a word corresponding to the character key 412 which has received the touch input, to the output region 310, but the present invention is not limited thereto.

That is, the controller 180 of the mobile terminal 100 according to an embodiment of the present invention can control the touch screen 151 to output the editing state display region 510 including the word corresponding to the character key by a touch input applied to the character key 412 in step S220.

On the touch screen 151, the editing state display region 510 may be displayed to be adjacent to the input region 410. For example, the editing state display region 510 may be disposed between the output region 310 and the input region 410. The editing state display region 510 may have a bar shape extending in a width direction perpendicular to a length direction of the mobile terminal 100. Hereinafter, the editing state display region 510 having the bar shape will be described, but the present invention is not limited thereto.

The editing state display region 510 may be positioned above the virtual keyboard 410. That is, the controller 180 controls the touch screen 151 to display a word in the editing state display region 510 in real time based on a touch input applied to the input region 410. Accordingly, the user can view and check a word to be output to the output region 310 in advance or in real time, while applying a touch input to the input region 410.

Also, when a touch input is applied to any one of the plurality of editing keys 411, the controller 180 controls the touch screen 151 to output visual information based on the touch input-applied editing key 411 to the editing state display region 510 in step S230. The controller 180 performs different editing functions according to types of the editing keys 411, and controls the touch screen 151 to output images representing the editing functions.

Referring to (b) and (c) of FIG. 3A, based on a touch input applied to a first editing key 411a, the controller 180 controls the touch screen 151 to output a first word 501 displayed on the editing state display region 510, to the output region 310. For example, the first editing key 411a may correspond to a space bar. That is, when the first word 501 is output on the editing state display region 510, and when a touch input is applied to the first editing key 411a, the controller 180 outputs the first word 501 to the output region 310 and terminates outputting of the first word in the editing state display region 510. Thereafter, when a touch input is applied to the first editing key 411a, the controller 180 forms a space from the first word in the output region 310. Alternatively, based on a touch input applied to the first editing key 411a, an output position of the first word 501 is changed and a space may be formed from the first word 501.

Meanwhile, when a touch input is applied to the first editing key 411a, the controller 180 controls the touch screen 151 to output first visual information 501'. Here, the first visual information 501' may be an animation image of the first word 501 moving from the editing state display region 510 to the output region 310. For example, the animation image may be the first word 501 which is gradually moved toward the output region 310 according to the passage of time and which is gradually varied to be decreased or increased in size.

Meanwhile, referring to FIGS. 3A(b) and 3A(d), based on a touch input applied to a preset second editing key 411b, the controller 180 deletes a portion of the first word 501 displayed in the editing state display region 510. That is, the second editing key 411b may correspond to an input cancel key for detecting a word, or the like.

When a touch input is applied to the second editing key 411b, the controller 180 controls the touch screen 151 to output second visual information 511 to the editing state display region 510. The second visual information 511 may correspond to a pre-set shape of the editing state display region 510. For example, the second visual information 511 may correspond to a shape, a color, and the like, forming the editing state display region 510. For example, the second visual information 511 may include a form of a line or a color forming the edge of a region in which the first word 501 is displayed or the editing state display region 510.

For example, the second visual information 511 may correspond to a line image formed in the edge region of the editing state display region 510 and having a preset color. That is, by the second visual information 511, a region of the edge of the editing state display region 510 is shown to be changed into a particular color. For example, by the second visual information 511, upper and lower edges of the editing state display region 510 may be displayed in a red color.

According to the present embodiment, since an input word is displayed in real time in the editing state display region 510 displayed to be adjacent to the input region 410 including character keys, the user can easily recognize a word being currently input or an editing state of a word without moving his or her eyes to the output region 310.

In addition, the controller 180 displays a state for outputting the first word input by a touch input to the output region 310, as the first visual information 501', and displays a state for deleting the first word 501 being output on the editing state display region 510, as the second visual information 511. Accordingly, the user can visually recognize a state in which a word is edited by a touch input. Thus, the user can recognize whether a word (and content) is being input as intended according to an applied touch, without having to move his or her eyes to the output region.

Figure 3B:
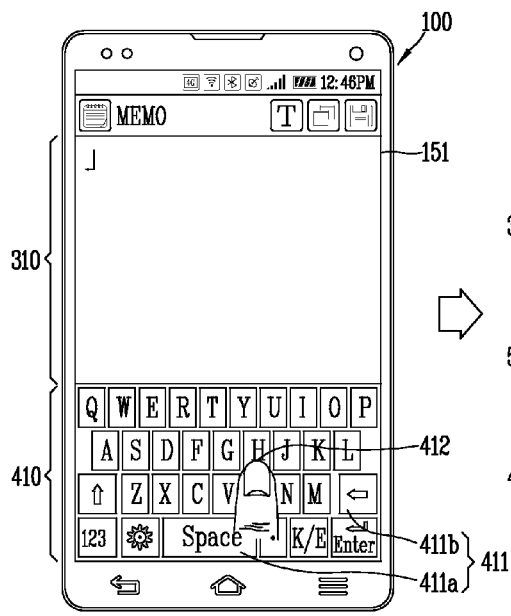
Figure 3B:
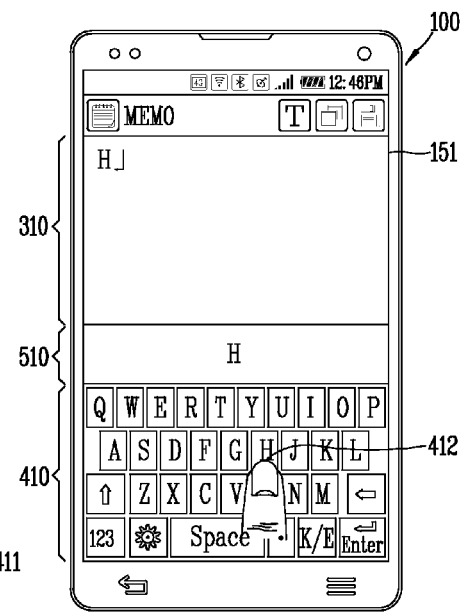
Figure 3B:
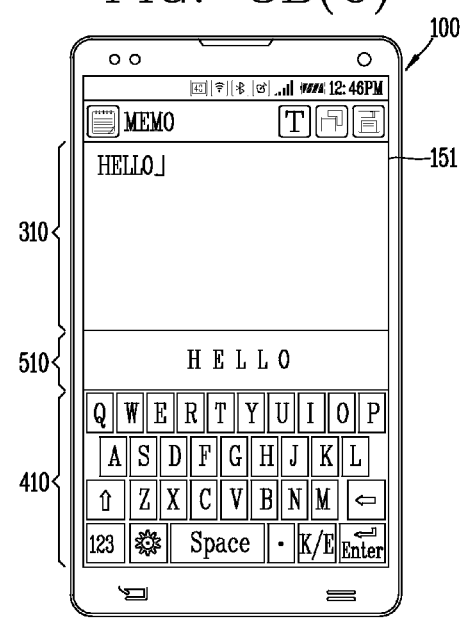

Meanwhile, referring to FIGS. 3B(a) to 3B(c), the touch screen 151 can output only the input region 410 and the output region 310, before a touch input is applied to the input region 410. In this instance, the controller 180 can control the touch screen 151 to output the editing state display region 510 between the input region 410 and the output region 310 based on a touch input applied to the input region 410. In this instance, a size of at least one of the input region 410 and the output region 310 can be adjusted.

Based on a touch input applied to a character key 412 of the input region 410, the controller 180 can control the touch screen 151 to output a word corresponding to the touch input-applied character key 412 to the editing state display region 510, and simultaneously output the word to the output region 310. That is, the touch screen 151 can output the word corresponding to the character key 412 to the output region 310 and the editing state display region 510 in real time.

In this instance, a control method of outputting the word corresponding to the character key 412 to the output region 310 and the editing state display region 510 in real time or a control method of preferentially outputting the word corresponding to the character key 412 only to the editing state display region 510 as described above with reference to FIGS. 3A(a) to (d) may be changed according to a user selection.

FIGS. 4A through 4F(c) are conceptual views illustrating a control method of changing an input position in an editing state display region. When the function of inputting a word is executed and a user's touch input is applied, the touch screen 151 can display an indicator indicating a position to which a word is to be input, in a region. The user can input characters in order based on a touch input and may add a new character between characters. Hereinafter, a control method of changing an input position when a word is output by applying a touch according to various embodiments will be described.

Figure 4A:
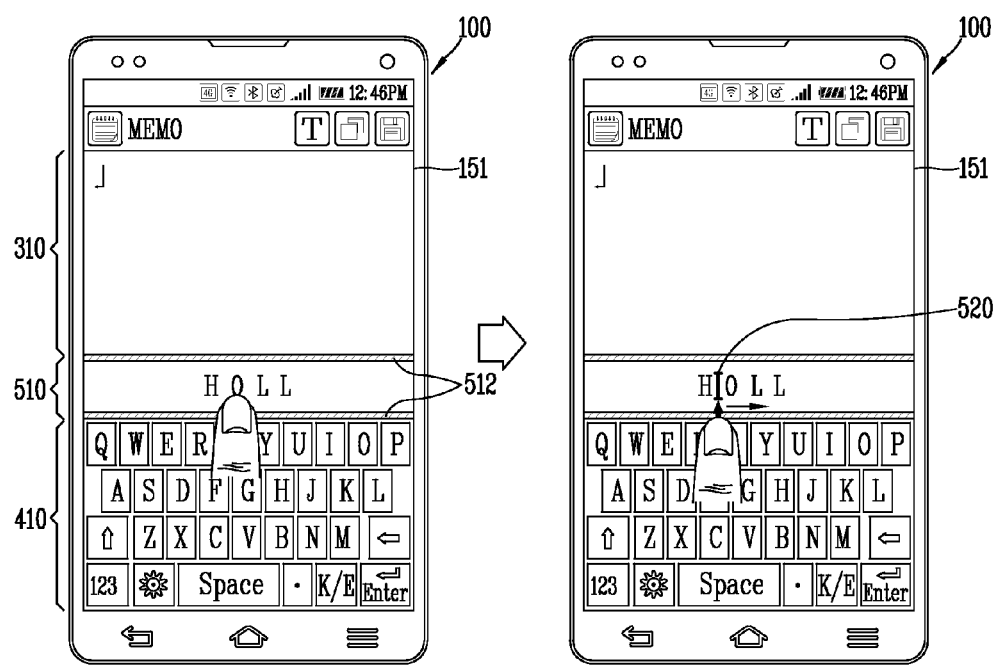
FIGS. 4A through 4F(c) are conceptual views illustrating a control method of changing an input position in an editing state display region.

Referring to FIG. 4A, the touch screen 151 outputs the editing state display region 510 including an input character between the output region 310 and the input region 410. When the word is output on the editing state display region 510, and when a touch input is applied to the editing state display region 510, the controller 180 controls the touch screen 151 to output a cursor 520 to a region corresponding to the touch input.

For example, when a touch input is applied between two characters, the controller 180 can display the cursor 520 between the characters. Also, when the cursor 520 is output, the controller 180 controls the touch screen 151 to output an additional character corresponding to a touch input applied to the input region 410, to the region where the cursor 520 is positioned.

Also, based on a continuous touch input applied to the editing state display region 510, the controller 180 can change the position of the cursor 520. The user can apply a touch input to the editing state display region 510 to designate a position between characters in order to input an additional character.

Meanwhile, when a touch input for forming the cursor 520 or moving the cursor 520 is applied to the editing state display region 510, the controller 180 controls the touch screen 151 to output third visual information 512. Here, the third visual information 512 may have a preset shape and color of the editing state display region 510 differentiated from the second visual information 511. Accordingly, when the third visual information 512 is output, the user can check that an input position is designated and changed by a touch input.

For example, the second visual information 511 may be implemented as a line image forming partial edges of the editing state display region 510 displayed in a red color, and the third visual information 512 may be implemented as a line image forming a partial edge of the editing state display region 510. That is, the user can recognize the current editing state upon seeing the change in the color of the edges of the editing state display region 510.

Meanwhile, when a word is output on the editing state display region 510 based on a touch input applied to a character key 412, the controller 180 can display a portion of the edges of the editing state display region 510 as a blue line. That is, the user can easily recognize when a character is input, when a character is deleted, and when an input position is changed, based on the edge color of the editing state display region 510.

Meanwhile, the controller 180 can output the first word 501 output by a touch input applied to the character key 412, also to the output region 310 in real time with the touch input. In this instance, the controller 180 can output the cursor 520 together with the first word 501 output on the output region 310. That is, the touch screen 151 can display an editing state output in the editing state display region 510, also in the output region 310 simultaneously.

Figure 4B:
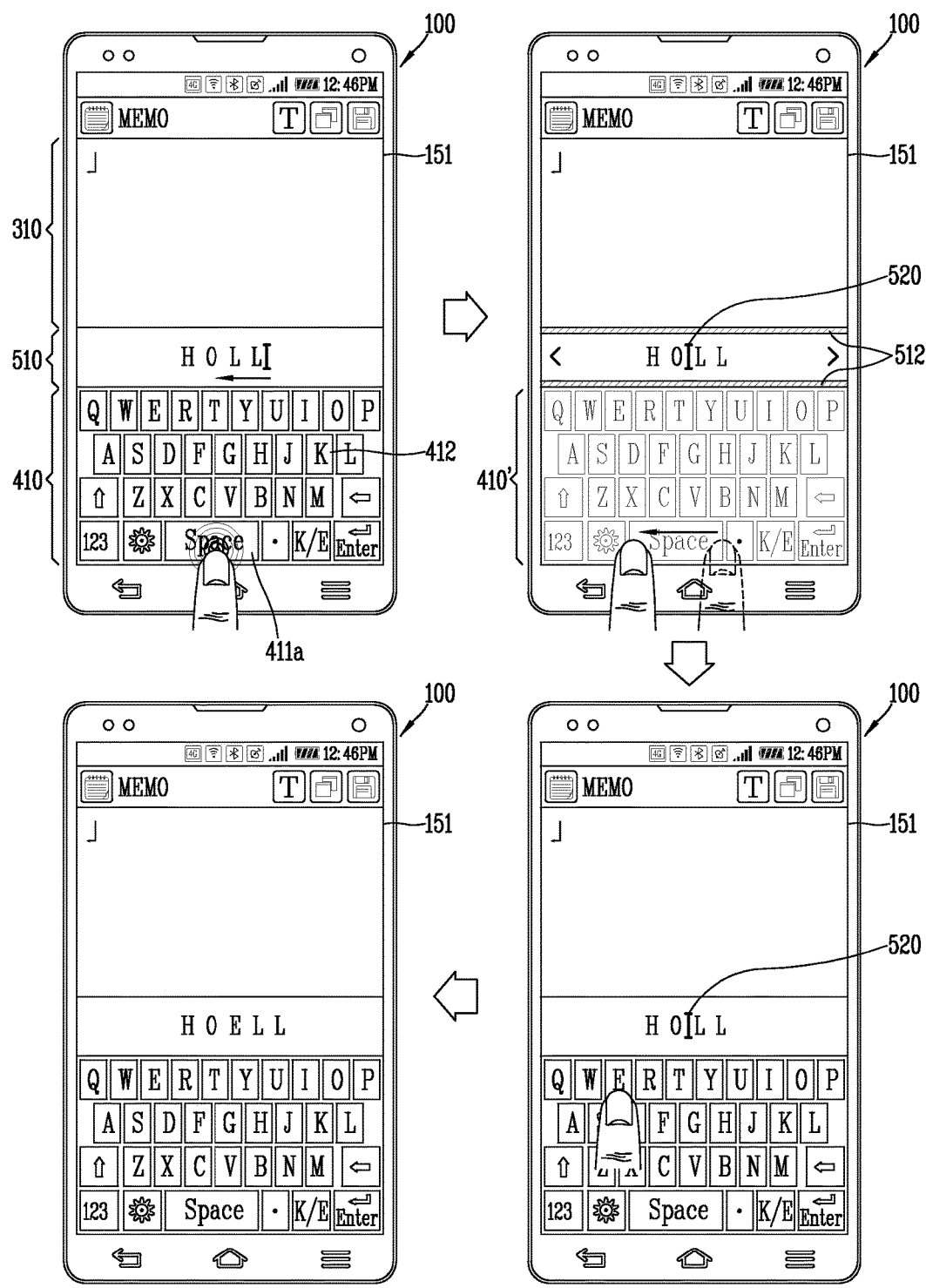
Figure 4C:
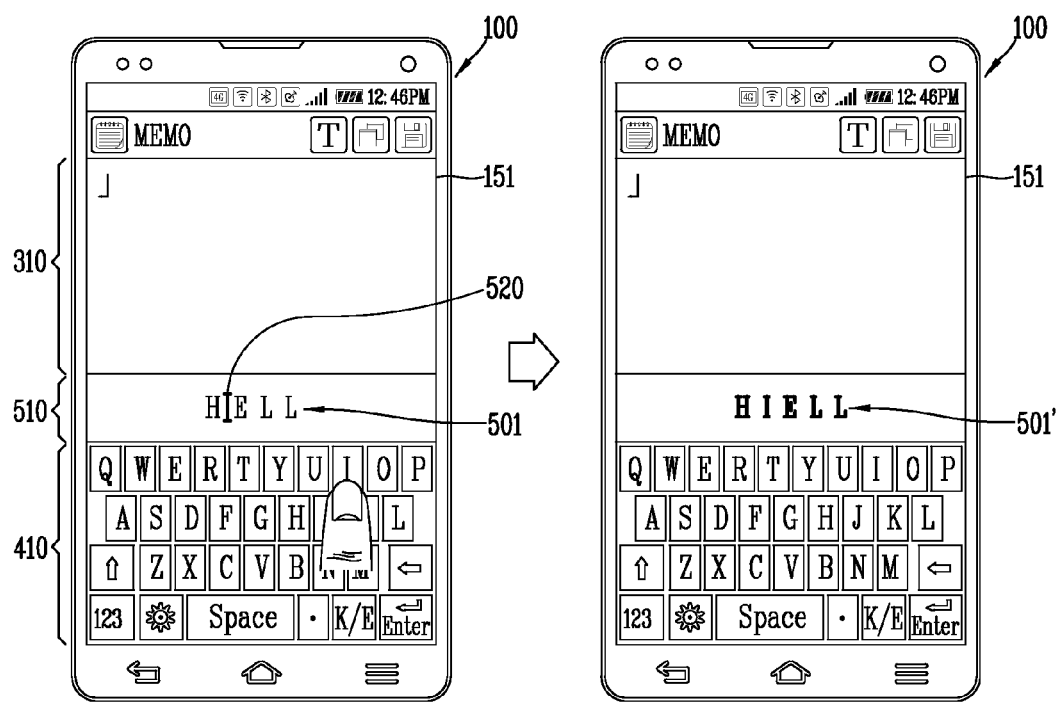

A control method of changing an input position on the editing state display region 510 by a touch input applied to the input region 410 will be described with reference to FIG. 4B. Based on a particular touch input applied to the input region 410, the controller 180 can change the input region 410 into a keypad region 410'. For example, when the keypad region 410' is activated, the touch screen 151 can output the virtual keyboard as a semi-transparent image.

That is, when the input region 410 is changed into the keypad region 410', the controller 180 limits receiving of a touch input applied to a plurality of keys forming the virtual keyboard. The particular touch input may include a preset region and a preset touch type. For example, the particular touch input may correspond to a long touch applied to the first editing key 411a.

When the particular touch input is applied, the controller 180 changes the input region 410 into the keypad region 410', and controls the touch screen 151 to change the shape of the virtual keyboard 410. For example, the touch screen 151 can adjust a color or transparency of the virtual keyboard 410.

The keypad region 410' receives a continuous touch input from the user, and based on the continuous touch input, the controller 180 can change an input position of the editing state display region 510. Basically, the input position is positioned on the right side of the word, and the input position may be moved to the left based on a touch input that moves to the left. Also, when a touch input is applied to the keypad region 410', the controller 180 controls the touch screen 151 to output the third visual information 512 to the editing state display region 510.

Here, the long touch applied to the first editing key 411a may be defined as a first touch and the continuous touch input for changing the input position may be defined as a second touch. The first and second touch inputs may correspond to the continuous touch input. That is, after the first touch is applied, when the touch is released from the touch screen 151, the controller 180 can change the keypad region 410' into the input region 410.

When the second touch is released, the controller 180 can change the keypad region 410' into the input region 410 and input an additional character to an input position designated by the second touch. A control method of outputting a varied word when an input word has a typo (typographical error) will be described with reference to FIG. 4C. The controller 180 can input a word to the designated input position.

When the first word 501 is displayed in the editing state display region 510, the controller 180 determines whether the spelling of the first word 501 is correct. That is, the controller 180 can determine whether the first word 501 exists in a dictionary.

When the first word 501 is a typo, the controller 180 controls the touch screen 151 to vary the first word into a varied word 501' and outputs the same. The first varied word 501' may include words substantially identical to those of the first word 501, but is different in a form thereof. For example, the first varied word 501' may be implement to have different font, font style, and color or given an animation effect to the first varied word 501'. Thus, the user can easily recognize that the input word is a typo.

A control method of correcting a word in the editing state display region 510 will be described with reference to FIGS. 4D(a) to 4D(d). The editing state display region 510 FIG. 4D(a) outputs third visual information 512. When the third visual information 512 is output, the controller 180 can designate an input position for inputting an additional word based on a user's touch input. Also, the touch screen 151 can output a cursor indicating an input position together with the word 501 on the editing state display region 510.

When the cursor is output between characters, the controller 180 controls the touch screen 151 to output a handwriting window 411' on the keypad region 410'. Also, in order to delete the character in the keypad region 410', the controller 180 controls the touch screen 151 to output an input cancel key 412' for receiving a touch input.

For example, when the virtual keyboard 410 is switched to the keypad region 410', the controller 180 limits inputting of a plurality of function keys and a plurality of characters included in the virtual keyboard. However, when the keypad region is switched to a handwriting window, the controller 180 activates the input cancel key 412' to receive a user's touch input.

Meanwhile, when a touch input is applied to the handwriting window 411', the controller 180 controls the touch screen 151 to output an image based on the touch input. For example, the controller 180 controls the touch screen 151 to analyze a touch input applied to the handwriting window 411', analyze a similar word, and output a word matched to the image to the editing state display region 510. Accordingly, when at least one of characters is erroneously input, while inputting characters, the user can simply add a character, without having to delete or edit the entire characters.

Figure 4D:
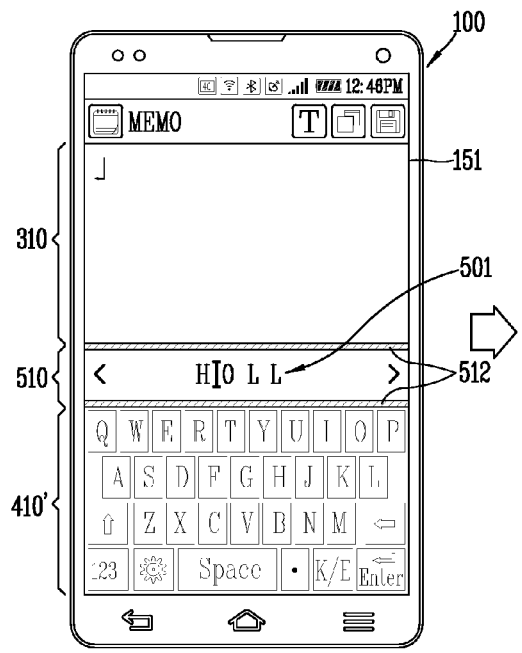
Figure 4D:
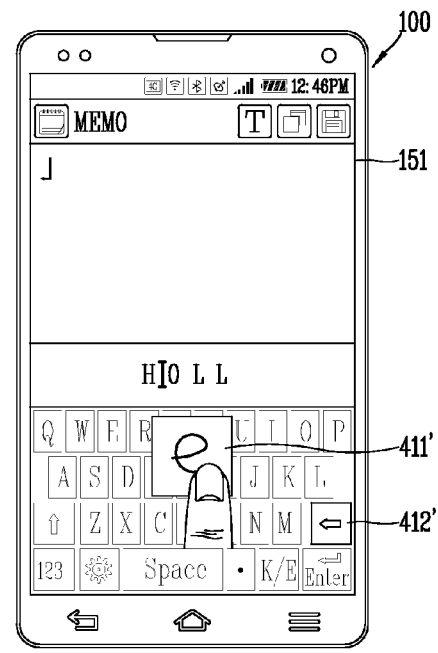
Figure 4D:
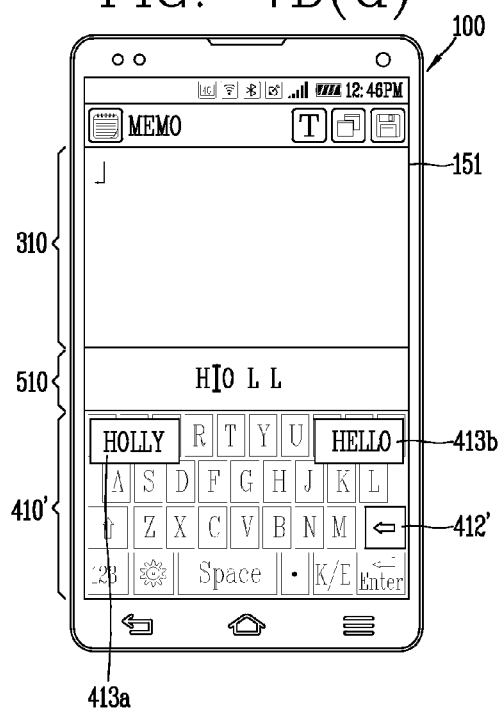
Figure 4D:
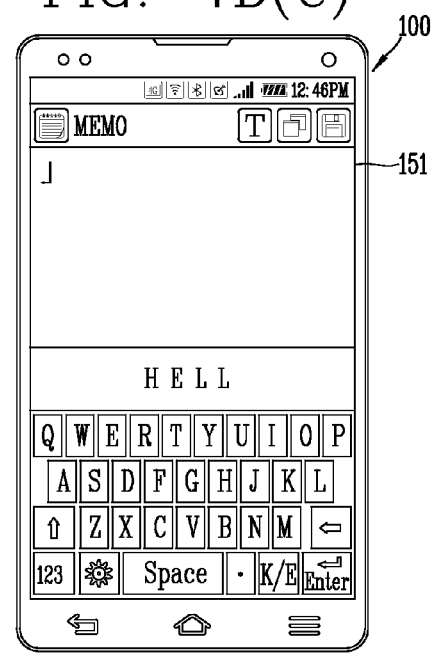

Referring to FIGS. 4D(a) and (d), when the word output on the editing state display region 510 is misspelled, the controller 180 controls the touch screen 151 to output recommendation words 413a and 413b related to the word. The touch screen 151 outputs the first and second recommendation words 413a and 413b disposed on both sides of the first word 501. The recommendation words may include words having a meaning in the dictionary. Also, in this instance, at least one of the input cancel key 412' and the handwriting window 411' may be output together with the first and second recommendation words 413a and 413b.

A control method of editing an output word output on the output region 310 will be described with reference to FIG. 4E. Characters based on the input region 410 are sequentially output to the output region 310. A word 501 corresponding to the character keys of the input region 410 to which touch inputs have been applied is output to the editing state display region 510. Meanwhile, based on a particular touch input applied to the first editing key 411a, the controller 180 switches the input region 410 to the keypad region 410'. Based on a continuous touch input applied to the keypad region 410', the controller 180 can gradually move the cursor 520 displayed on the right side of the first word 501 to the left of the first word 501. When the continuous touch input is continuously applied, the controller 180 can sequentially output the previously input word.

Figure 4E:
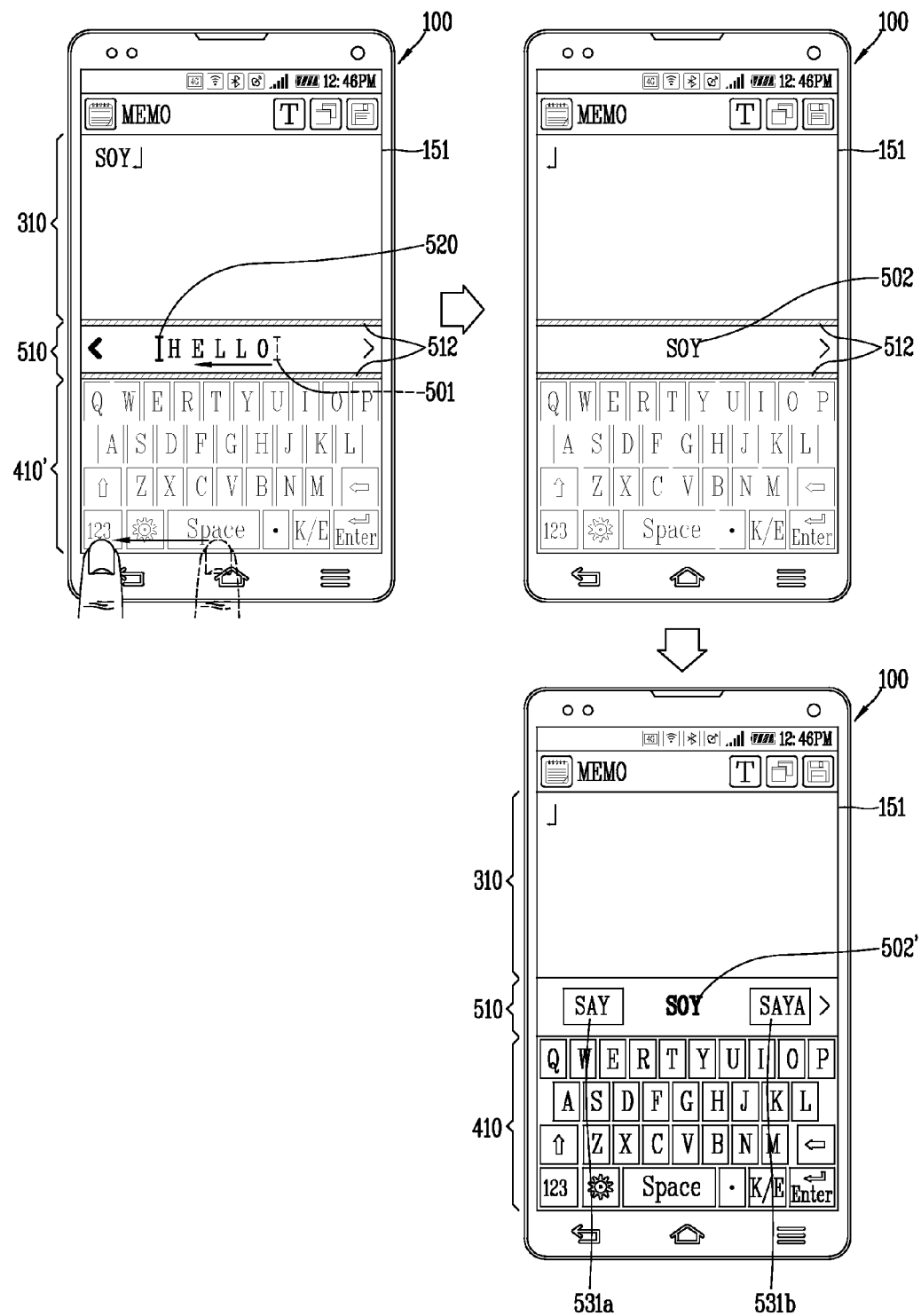

Referring to FIG. 4E, when a second word 502 (SOY) is output on the output region 310 and the first word 501 is output on the editing state display region 510, and when touch inputs are continuously applied to the keypad region 410, the second word 502 is output to the editing state display region 510. Also, in this instance, the controller 180 can control the touch screen 151 to output the third visual information 512.

When the first word 501 is changed to the second word 502 in the editing state display region 510, the controller 180 can extract third and fourth recommendation words 531a and 531b with respect to the second word 502, and controls the touch screen 151 to output the third and fourth recommendation words 531a and 531b.

Here, the first to fourth recommendation words 413a, 413b, 531a, and 531b may be output no matter whether the word displayed in the editing state display region 510 is spelled or misspelled. That is, when a word is related to the word displayed in the editing state display region 510, the word may be selected as a recommendation word. Accordingly, the user can sequentially check the words output on the output region 310 by applying touch inputs to the input region 410, without having to apply touch inputs to the output region 310 or move his or her eyes.

Figure 4F:
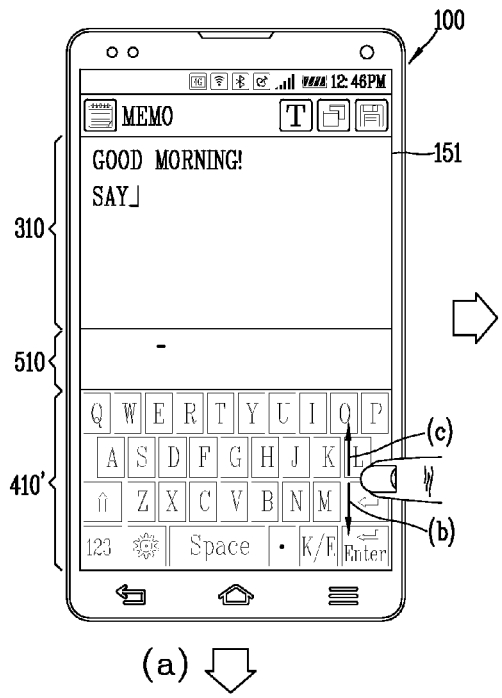
Figure 4F:
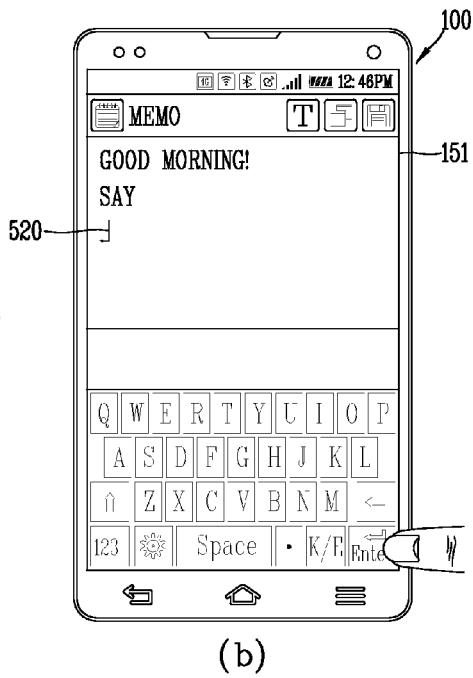
Figure 4F:
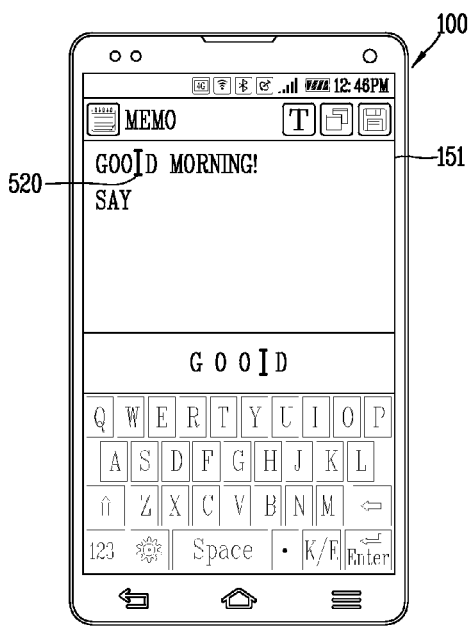

A control method of changing an input position on the output region 310 will be described with reference to FIGS. 4F(a) to 4F(c). Referring to FIG. 4F(a), the touch screen 151 outputs words in a plurality rows. "GOOD MORNING" is output in the first row, and "SAY" is output in the second row. Based on a touch input applied to the first editing key 411a, the controller 180 switches the input region 410 to the keypad region 410'.

Based on a touch input continued from a touch input applied to the first editing key 411a and moving up and down on the touch screen 51, the controller 180 can change rows of the input positions. Here, the up/down direction correspond to a length direction of the mobile terminal 100.

Referring to FIGS. 4F(a) and 4F(b), based on a touch input in a downward direction, the controller 180 can change an input position to a new row in the input region 410. The cursor 520 may be displayed in a new row. Referring to FIGS. 4F(a) and 4F(c), based on a touch input applied in an upward direction, the controller 180 can change the input position to between "GOO" and "O" in the input region 410, and control the touch screen 151 to output the cursor 520.

When an input position is designated to between characters forming a word, the controller 180 can control the touch screen 151 to output the word to the editing state display region 510. According to the present embodiment, when the user wants to input a word or edit a word in the middle of a long sentence created in a plurality of rows, the user can designate an input position without having to apply a touch input to the input region 410.

Figure 5A:
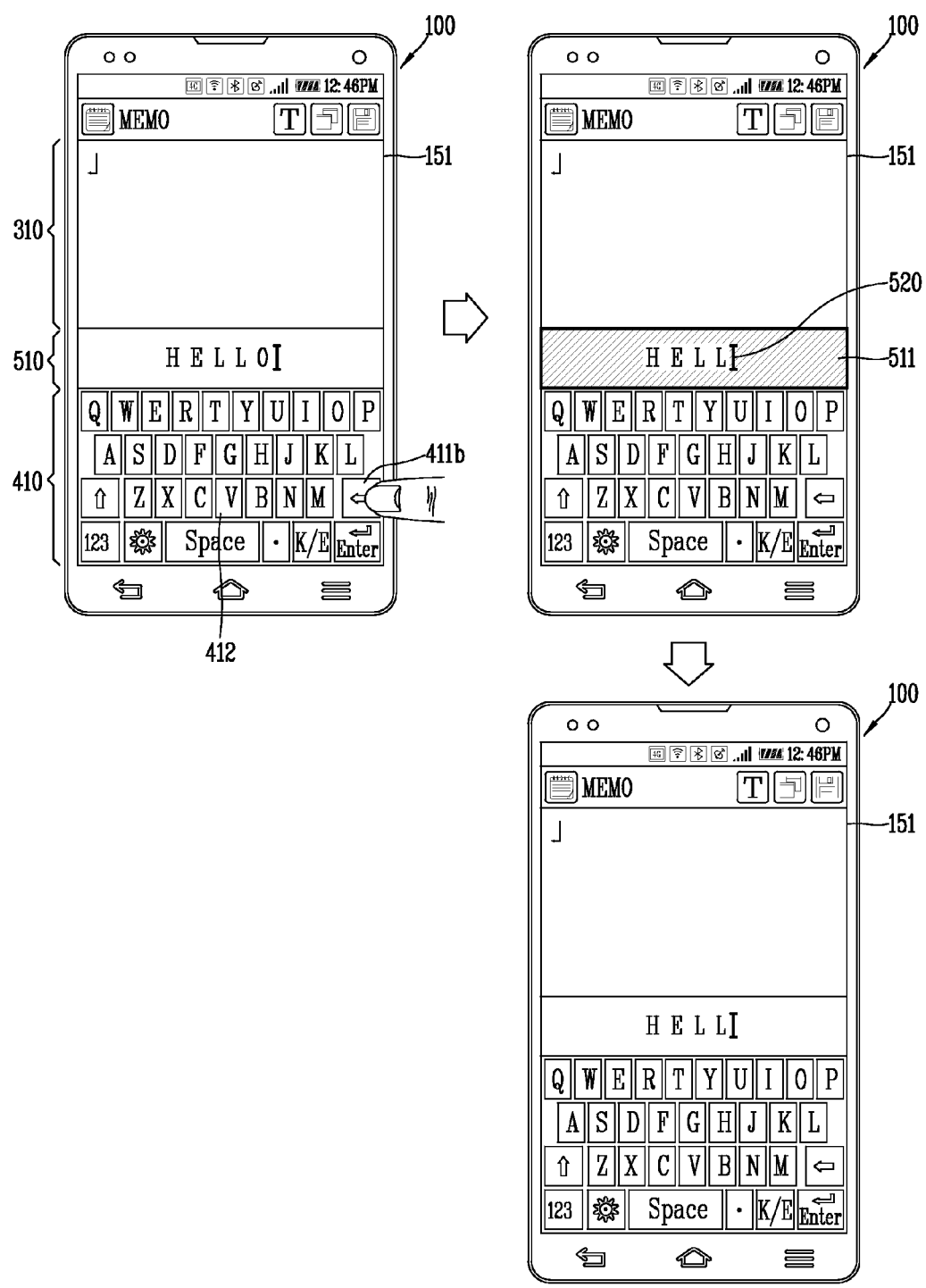
FIGS. 5A and 5B are conceptual views illustrating a control method of deleting a word output on an editing state display region according to various embodiments of the present invention.
Figure 5B:
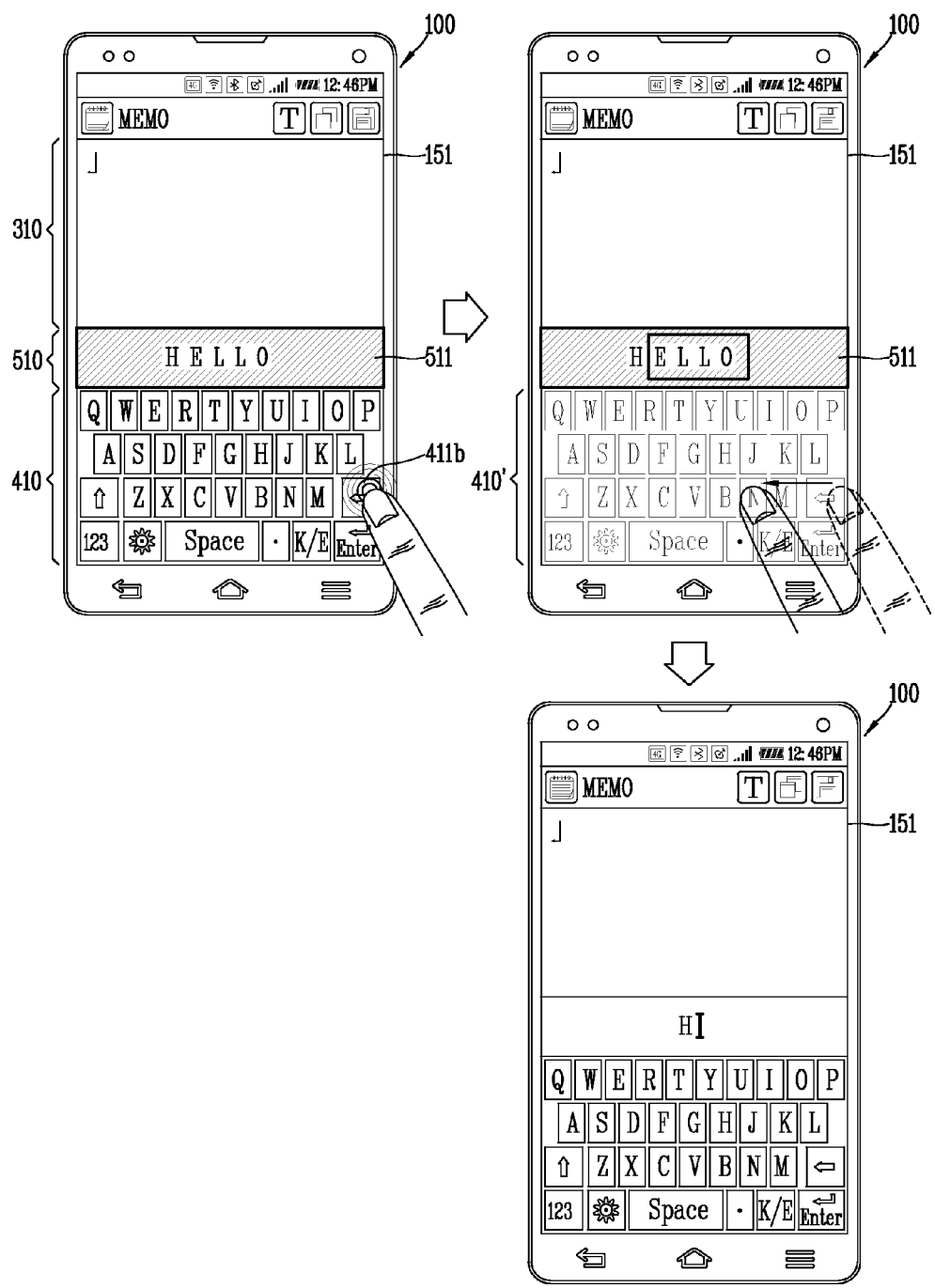

FIGS. 5A and 5B are conceptual views illustrating a control method of deleting a word output on the editing state display region according to various embodiments of the present invention. Referring to FIG. 5A, when a touch input is applied to the second editing key 411b corresponding to an input cancel key among the editing keys 411, the controller 180 controls the touch screen 151 to output the second visual information 511 to the editing state display region 510. Based on a touch input applied to the second editing key 412b, the controller 180 deletes a portion of the word based on the touch input applied to the second editing key 411b.

When the touch input applied the second editing key 411b is released, the controller 180 controls the touch screen 151 to limit outputting of the second visual information 511. For example, when the second visual information 511 corresponds to a changed color of the editing state display region 510, the controller 180 can control the touch screen 151 to restore the color of the editing state display region 510.

That is, the user can quickly check the editing state according to an editing key to which a touch input is applied by the second visual information displayed in the editing state display region 510, without having to move his or her eyes to the input region 410.

A control method of deleting a portion of a word based on a touch input applied to a keypad region will be described with reference to FIG. 5B. When a preset particular type third touch is applied to the second editing key 411b corresponding to an input cancel key, among the editing keys 411, the controller 180 switches the input region 410 to the keypad region 410'. Here, the preset particular type third touch may correspond to a long touch input applied for a preset period of time (a few seconds).

Also, the controller 180 controls the touch screen 151 to output the second visual information 511 to the editing state display region 510. Meanwhile, based on a fourth touch continuously applied with the third touch, the controller 180 selects a portion of the word. The fourth touch may correspond to a continuous touch input moving in a particular direction. For example, when the fourth touch moves in a leftward direction, at least a portion of sequential characters from the right to the left of the characters may be selected.

The controller 180 can control the touch screen 151 to display the selected characters. For example, the touch screen 151 can block the selected characters or output the selected characters in a different font.

When the third touch is released from the touch screen 151, the controller 180 controls the touch screen 151 to delete the selected characters. That is, the plurality of selected characters may be deleted by the third and fourth touches. Also, when the third touch is released, the controller 180 switches the keypad region 410' to the input region 410 and controls the touch screen 151 to limit outputting of the second visual information 511.

According to the present embodiment, a plurality of characters may be first selected based on a touch input applied to the second editing key 411b and may be controlled to be deleted at a time. Also, by outputting the second visual information based on a delete control command by the second editing key 411b, the touch screen 151 can inform that the delete control command is input, and when a plurality of characters are selected, the touch screen 151 displays the plurality of characters to inform about them visually. Since these are all displayed in the editing state display region 510, the user can recognize a deletion state and a character to be selected to be deleted in advance, without moving his or her eyes to the input region 410.

Figure 6A:
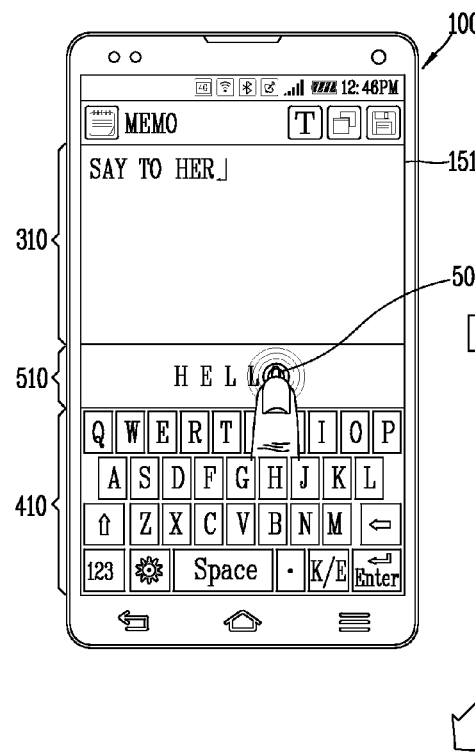
FIGS. 6(a) to 6(d) are conceptual views illustrating a control method of controlling an output position of a word based on a touch input in an editing state display region.

FIGS. 6(a) to 6(d) are conceptual views illustrating a control method of controlling an output position of a word based on a touch input in the editing state display region. Based on a touch input applied to the input region 410, the controller 180 outputs a first word 501 to the editing state display region 510 as shown in FIG. 6(a).

Figure 6B:
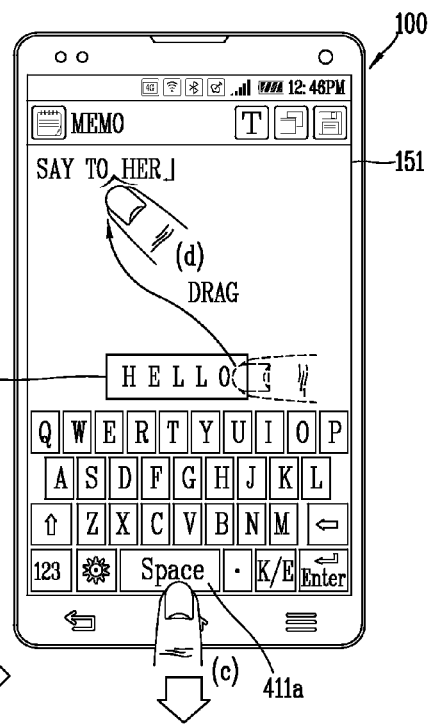
Figure 6D:
Figure 6C:
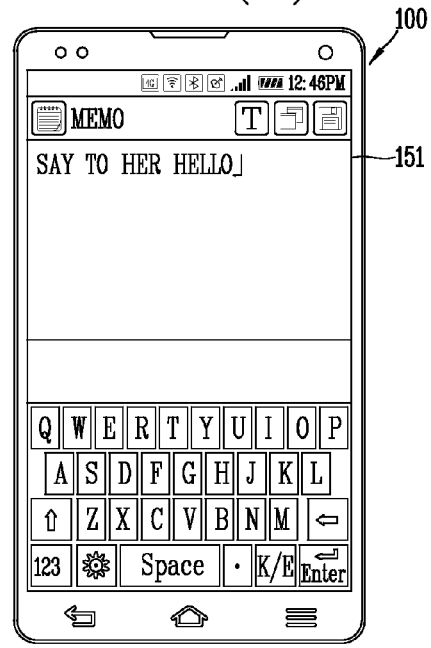

Referring to FIGS. 6(b) and 6(c), based on a touch input applied to the first editing key 411a, the controller 180 outputs the first word 501 to the output region 310 and controls the touch screen 151 to terminate outputting of the first word on the editing state display region 510.

Referring to FIGS. 6(b) and 6(d), based on a touch input applied to the first word 501, the controller 180 can control a position of the first word in the output region 310. In more detail, based on a fifth touch applied to the first word 501 for a preset period of time and a sixth touch continuously applied with the fifth touch, the controller 180 determines a region of the output region 310. The fifth touch may correspond to a long touch input applied to a region in which the first word 501 is output, and the sixth touch may correspond to a dragging touch input continued from the fifth touch and moving to the output region 310.

When the sixth touch is released, the controller 180 controls the touch screen to output the first word 501 to a region of the output region 310. When a plurality of characters have already been input on the output region 310, the controller 180 can control the touch screen 151 to output the first word 501 to between the plurality of characters based on the sixth touch.

When the fifth touch is applied, the control unit may control the touch screen 151 to output fourth visual information 513 to the first word 501. For example, the fourth visual information 513 may correspond to the first word 501 having a changed shape or may be implemented as an edge image formed along the outer circumference of the first word 501, or the like.

Meanwhile, the touch screen 151 can output the first word 501 to move to a region corresponding to the sixth touch.

Also, when a sixth touch is applied to between a plurality of already output characters, the positions of the plurality of characters may be temporarily changed. Accordingly, before inputting a character, the user does not need to control a position to be input to the input region 410, and thus, the user can easily edit characters to be output.

Figure 7C:
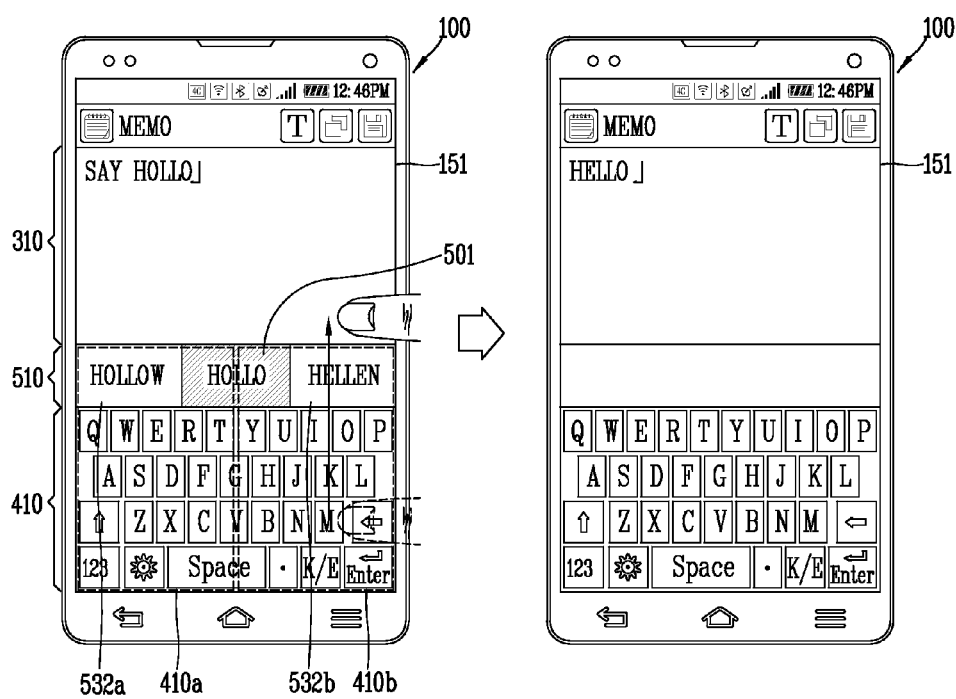

FIGS. 7A through 7E(d) are conceptual views illustrating a control method of inputting a word to an input region. Referring to FIG. 7A, based on a touch input applied to the character key 412, the controller 180 controls the touch screen 151 to output the first word 501 to the editing state display region 510. The controller 180 outputs fifth and sixth recommendation words 532a and 532b of the first word 501 to the editing state display region 510.

For example, the fifth and sixth recommendation words 532a and 532b may be disposed on both sides of the first word 501, and fonts of the fifth and sixth recommendation words 532a and 532b may be implemented to be different from the font of the first word 501. Sizes of the fifth and sixth recommendation words 532a and 532b may be smaller than that of the first word 501. The fifth and sixth recommendation words 532a and 532b may be output when the first word 501 is recognized as a typo, but the present invention is not limited thereto.

Based on a touch input applied to the first editing key 411a among the editing keys 411, the controller 180 can control the touch screen 151 to output the first word 501 to the output region 310. The controller 180 controls the touch screen 151 to output the first visual information 501'. That is, the first visual information 501' may be formed as an animation image moving from the editing state display region 510 to the output region 310.

Meanwhile, based on a touch input applied to the first editing key 411a, the controller 180 controls the touch screen 151 to limit outputting of the fifth and sixth recommendation words 532a and 532b. That is, when outputting to output region 310 is completed, characters which have been output to the editing state display region 510 disappear.

A control method of outputting a recommendation word to the output region will be described with reference to FIGS. 7B(a) to 7B(c). Referring to FIG. 7B(a), when the first word 501 is output to the editing state display region 510, the controller 180 outputs the fifth and sixth recommendation words 532a and 532b of the first word 501 to the editing state display region 510. The fifth and sixth recommendation words 532a and 532b are displayed on both sides of the first word 501.

The input region 410 may be divided into first and second regions 410a and 410b for receiving a continuous touch input according to a preset direction. The first and second regions 410a and 410b are formed in regions adjacent to the fifth and sixth recommendation words 532a and 532b, respectively. Based on a touch input applied to the first region 410a or the second region 410b, the controller 180 controls the touch screen 151 to output a recommendation word corresponding to the first region 410a or the second region 410b, to the output region 310.

For example, based on a touch input first applied to the second region 410b, passing through the sixth recommendation word 532b, and applied to a region of the output region 310, the controller 180 can display the sixth recommendation word 532b on the output region 310. The touch input may correspond to a dragging type touch input or a flicking type touch input. However, the touch input cannot be repeatedly applied both to the first and second regions 410a and 410b.

Meanwhile, when the touch input is applied and a recommendation word output to the output region 310 is selected, the controller 180 controls the touch screen 151 to output the fifth visual information 514 in the editing state display region 510. The fifth visual information 514 may be implemented in such a form in which at least a region of the editing state display region 510 is changed. That is, based on the fifth visual information 514, the user can recognize that a word in the editing state display region 510 is output to the output region 310.

For example, when the fifth visual information 514 is displayed in a region in which the selected recommendation word is displayed in the editing state display region 510, the user can easily recognize the word to be selected to be output to the output region 310. Also, before the recommendation word is output to the output region 310, an animation image in which the recommendation word moves from the editing state display region 510 to the output region 310 may be displayed.

So far, the touch input passing through the sixth recommendation word 532b has been described, but the present invention is not limited thereto. For example, when a continuous touch input (flicking type touch input) applied to the first region 410a or the second region 410b is sensed, the controller 180 can output the fifth recommendation word 532a and the sixth recommendation word 532b to the output region 310. Here, however, the touch input applied to the first region 410a or the second region 410b may be applied in an upward direction in the touch screen 151, that is, in a direction close to the input region 410.

A method of outputting a recommendation word based on a touch input applied to the first region 410a or the second region 410b will be described with reference to FIG. 7C. The touch screen 151 according to the present embodiment outputs the first word 501 based on a touch input applied to the character key 412, to the editing state display region 510 and the output region 310 substantially at the same time.

The controller 180 outputs the fifth and sixth recommendation words 532a and 532b with respect to the first word 501 to the editing state display region 510, and divides the input region 410 into the first and second regions 410a and 410b. Based on a continuous touch input applied to the second region 410b, the controller 180 deletes the first word 501 in the output region 310, and controls the touch screen 151 to output the sixth recommendation word 532b to the region in which the first word 501 is output. That is, the user can conveniently change the input first word with the recommendation word.

Meanwhile, the controller 180 can determine whether the first word 501 has a typo. When it is determined that the first word 501 has a type, the controller 180 controls the touch screen 151 to vary the first word 501 in the editing state display region 510. For example, the touch screen 151 can shade the first word 501 with a preset color or may change a font of the first word 501 and output the same. Also, the controller 180 can control the touch screen 151 to vary the first word 501 in the output region 310 such that it is substantially identical to the first word 501 in the editing state display region 510, and output the same.

Even though a different character is output to the editing state display region 510 based on a touch input applied to the character key 412, the controller 180 can control the touch screen 151 to output the first word 501 in a varied form in the output region 310. Accordingly, when a recommendation word with respect to the first word 501 is output, the control unit 501 may check whether the first word 501 has a type, and even though a different word is output to the editing state display region 510, a typo may be easily recognize in the output region 310.

Also, in the present embodiment, a continuous touch input applied to the first region 410a or the second region 410b may pass through the region in which the fifth recommendation word 532a or the sixth recommendation word 532b or may not be applied to the editing state display region 510.

Figure 7D:
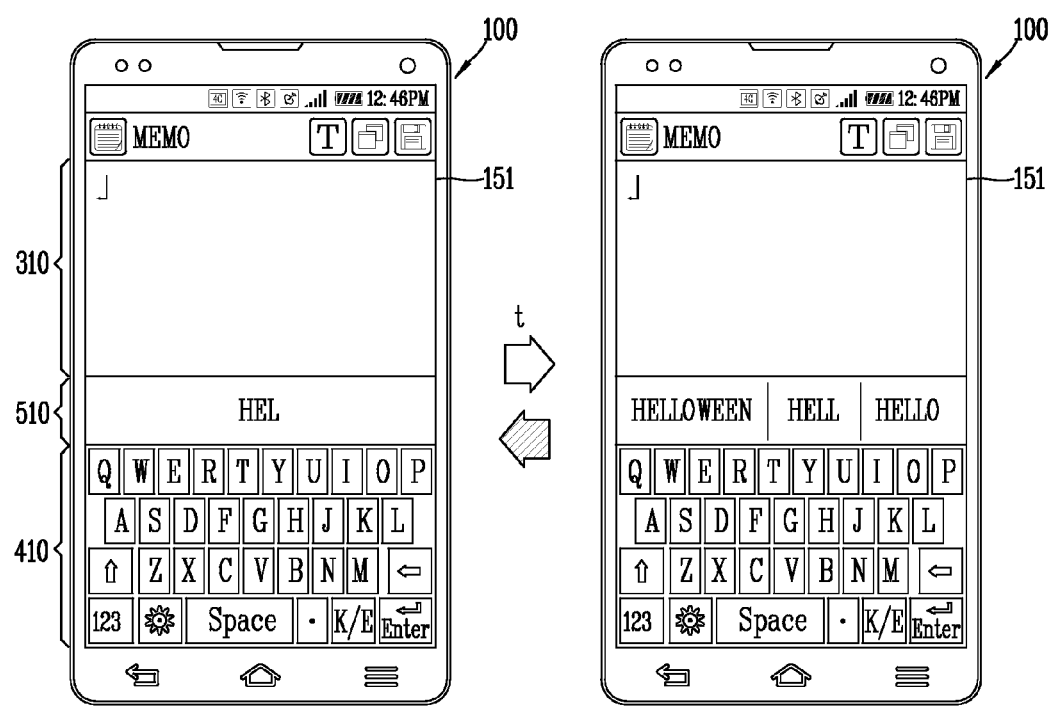

A control method of providing a recommendation word will be described with reference to FIG. 7D. Based on a touch input applied to the input region 410, the control unit outputs a word corresponding to the character key to which the touch input applied, to the editing state display region 510.

After a word is input to the editing state display region 510, when a touch input is not applied to the input region 410 for a preset period of time t, the controller 180 controls the touch screen 151 to output a recommendation word based on the word. That is, when the preset period of time has passed, the controller 180 can search for and extract a recommendation word based on the word. The touch screen 151 outputs the extracted recommendation word to the editing state display region 510. However, when a touch input is applied to the input region 410 and a word is input, the controller 180 controls the touch screen 151 to limit outputting of the recommendation word.

Figure 7E:
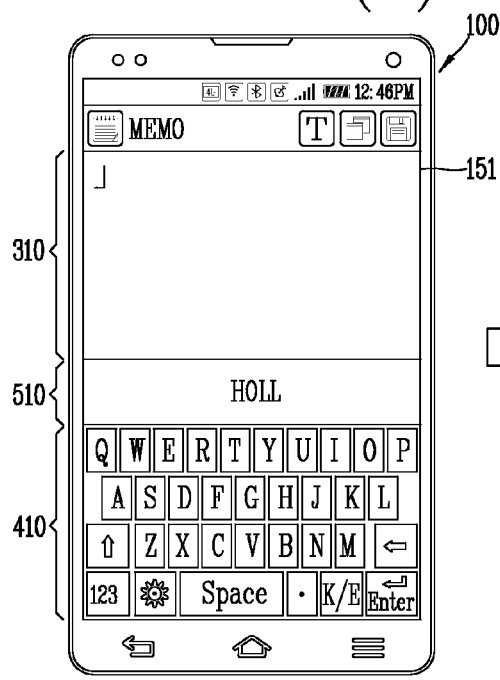
Figure 7E:
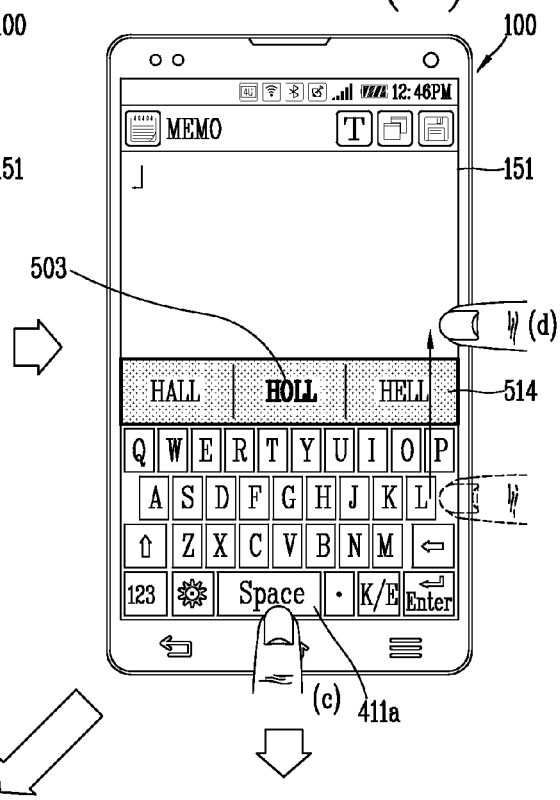
Figure 7E:
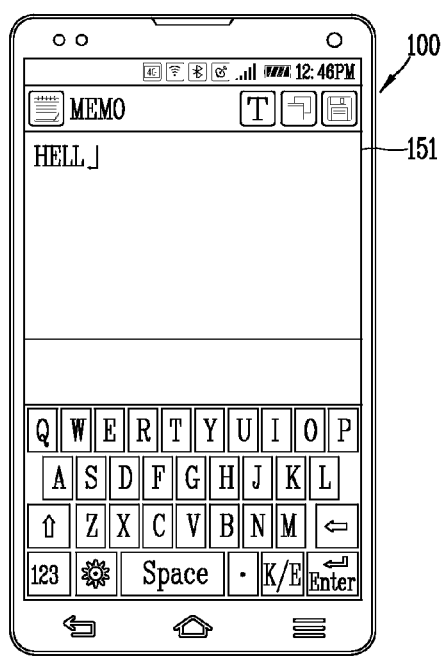
Figure 7E:
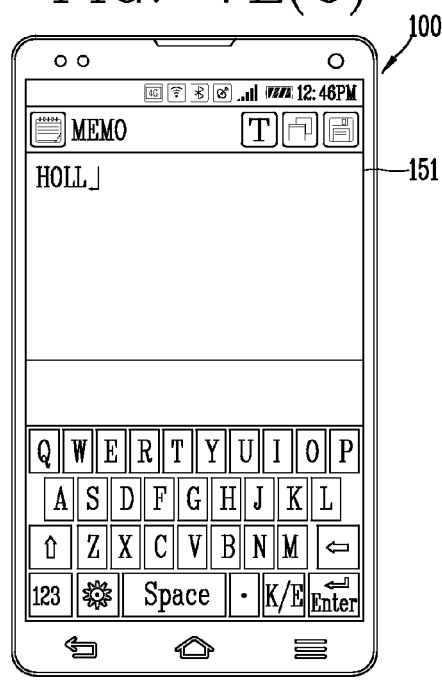

Referring to FIGS. 7E(b) and 7E(c), when a third word 503 and recommendation words of the third word 503 are output to the editing state display region 510, the controller 180 controls the touch screen 151 to output a recommendation word to the output region 310 based on a touch input continuously applied from a portion of the input region 410 to the editing state display region 510.

Referring to FIGS. 7E(b) and 7E(d), based on a touch input applied to the first editing key 411a among the editing keys 411 of the input region 410, the controller 180 controls the touch screen 151 to output a character corresponding to a character key which has received a touch input in the input region 410, to the output region 310.

Referring to FIG. 7E(b), based on a touch input applied to output the word displayed in the editing state display region 510 to the output region 310, the controller 180 controls the touch screen 151 to output fifth visual information 514 to at least one region of the editing state display region 510. That is, when a plurality of words are output to the editing state display region 510, the user can select a word to be output to the output region 310 based on various types of touch inputs.

Figure 8:
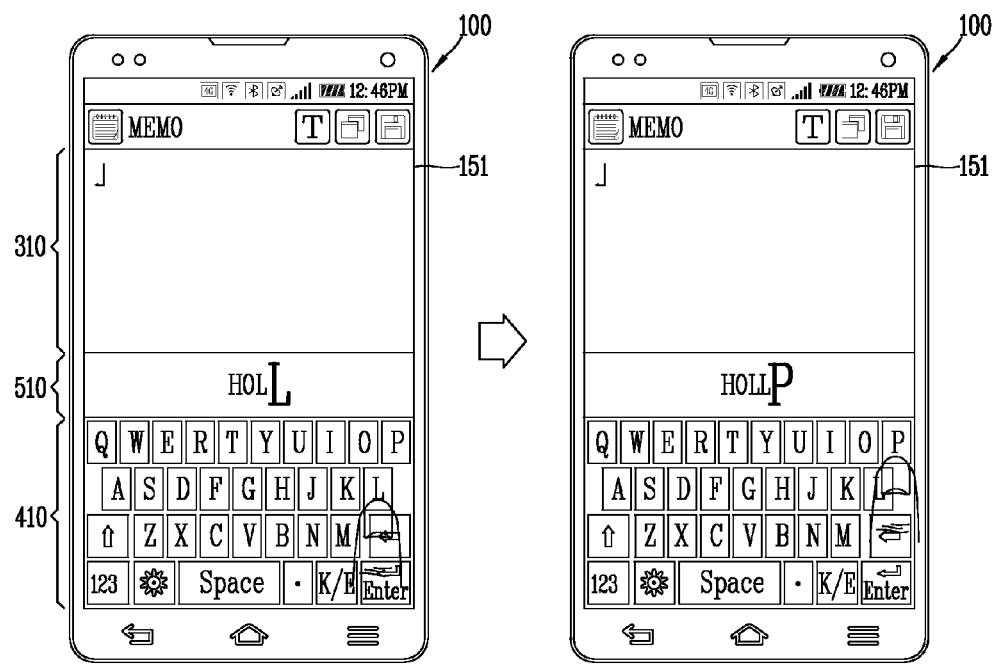
FIG. 8 is a conceptual view illustrating a control method of emphatically displaying a word based on a touch input applied to an input region in an editing state display region.

FIG. 8 is a conceptual view illustrating a control method of emphatically displaying a word based on a touch input applied to an input region in an editing state display region. Based on a touch input applied to a character key of the input region 410, the controller 180 outputs a word corresponding to the character key in real time.

When a touch input is applied to the character key, the word corresponding to the character key is output in a preset font. Here, the font may include a size, a thickness, and an underscore of the word, a color of the word, Italic font, a shadow effect, and the like. The preset type of word is changed to a reference font such as that of the already output word by an additional touch input applied to the input region. Alternatively, the controller 180 controls the touch screen 151 to change the word into the reference font when a preset period of time has lapsed. For example, the previously input word may be output in a black color, and the recently input word may have an increased size and output in a blue color so as to be emphasized. Accordingly, the user can easily recognize the word output by the recently applied touch input.

Figure 9A:
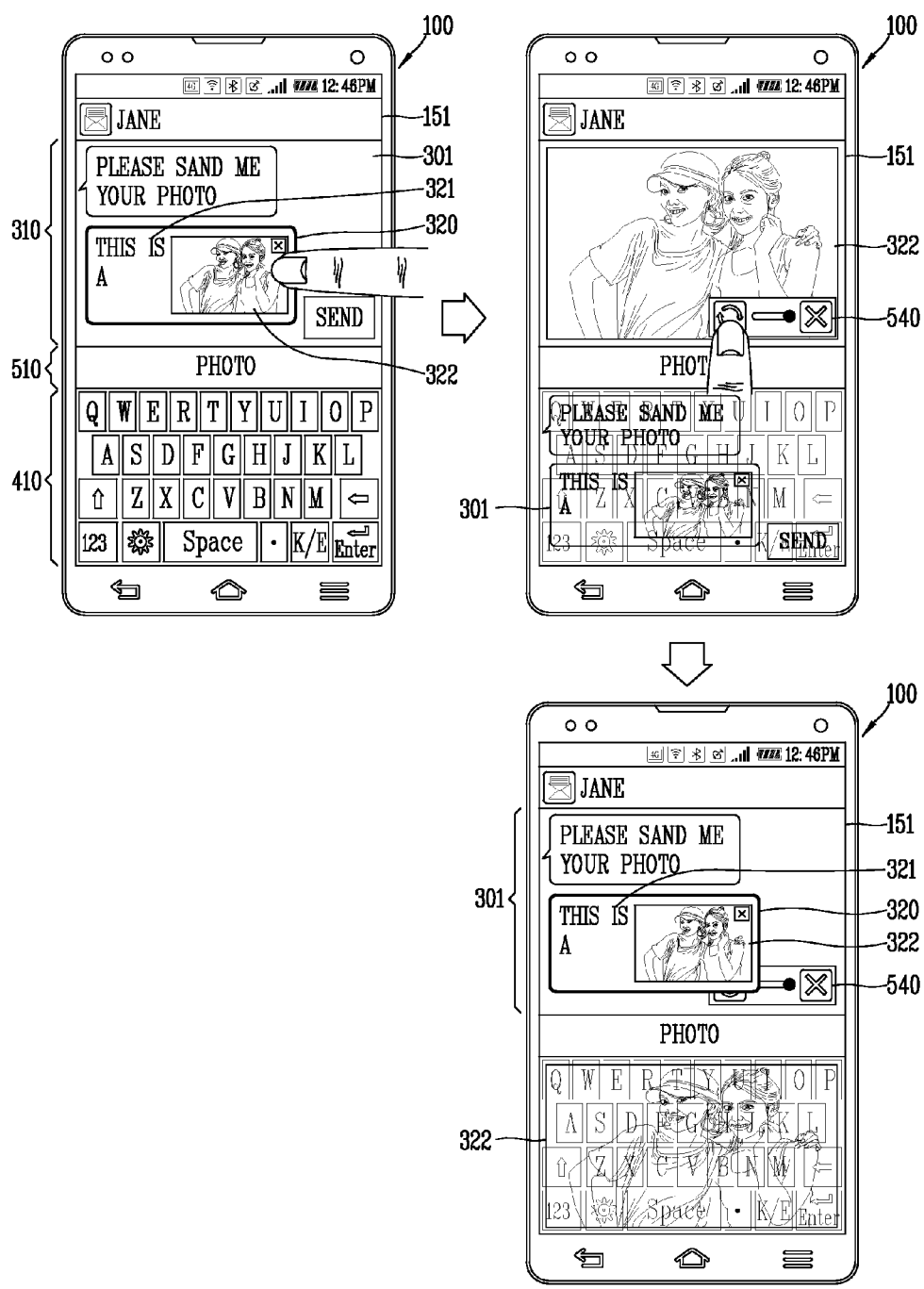
FIGS. 9A through 9D(d) are conceptual views illustrating screen information output to an input region.

FIGS. 9A through 9D(d) are conceptual views illustrating screen information output to an input region. Referring to FIG. 9A, when an application is executed, the touch screen 151 outputs a first execution screen 301 and the input region 410, and outputs a word to the editing state display region 510 based on a touch input applied to the input region 410. The first execution screen 301 is displayed in the output region 310. The first execution screen 301 includes a first output window 320 outputting a word 321 based on a touch input applied to the input region 410.

For example, when a message application is executed, a send message input by the user is output to the first output window 320. Also, a first image 322 to be sent together with the send message may be displayed in the first output window 320.

Referring to FIG. 9A, based on a touch input applied too the first image 322, the controller 180 outputs the image to the output region 310. The controller 180 controls the touch screen 151 to magnify the first image 322 and output the magnified first image 322 according to the size of the output region 310.

Meanwhile, the controller 180 controls the touch screen 151 to output the first execution screen 301 to the input region 410. The first execution screen 301 is output to overlap the virtual key board. The touch screen 151 outputs the first execution screen 301 and the virtual keyboard in a semi-transparent state.

Meanwhile, when the first execution screen 301 is output on the input region 410, the controller 180 controls the touch screen 151 to output a first graphic image 540 for receiving a touch input to change an output position of the first execution screen 301. Referring to of FIG. 9A, when a touch input is applied to the graphic image 540, the controller 180 outputs the first execution screen 301 to the output region 310 again. In this instance, the controller 180 can control the screen 151 to output the first image 322 such that it overlaps the virtual keyboard.

Based on a touch input applied to the input region 410, the controller 180 controls the touch screen 151 to input a word 321 to the first output window 320. Accordingly, the user can recognize an image to be sent, and output an execution screen and an image to a desired region, whereby the user can recognize desired information, while the virtual keyboard for inputting a word is being output on the limited touch screen 151.

Figure 9B:
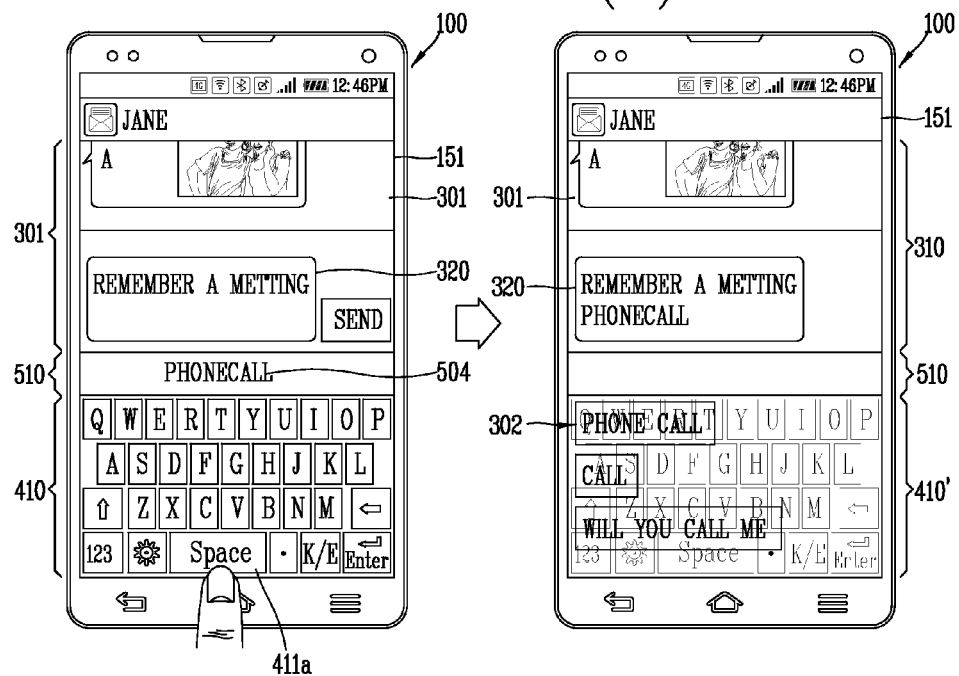
Figure 9B:
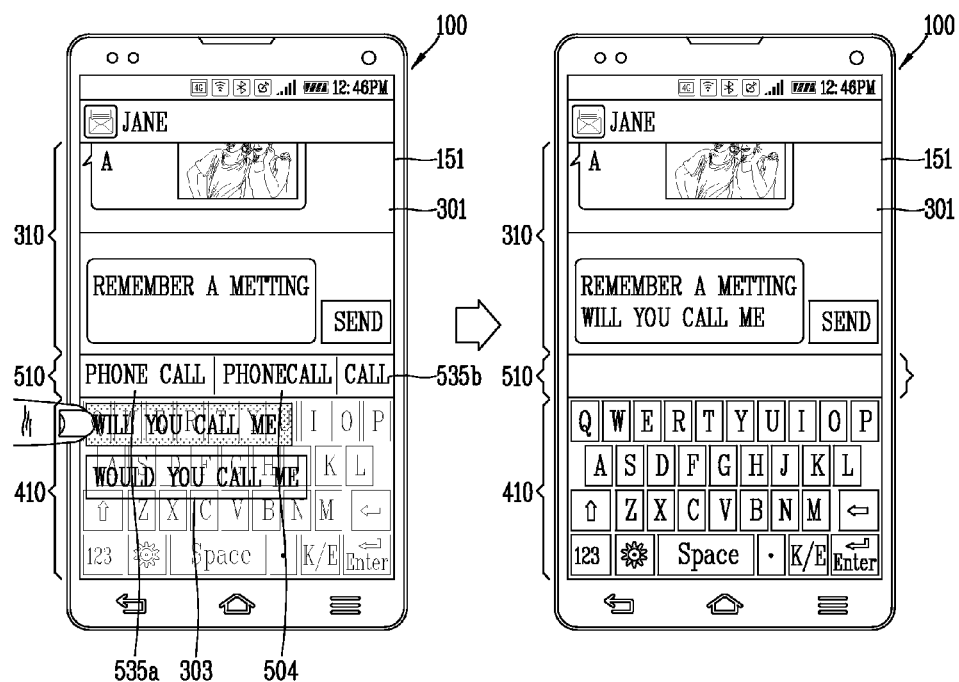

A control method of outputting a recommendation word to the input region will be described with reference to FIGS. 9B(a) and 9B(b). Referring to FIG. 9B(a), based on a touch input applied to the input region 410, the controller 180 controls the touch screen 151 to output a fourth word 504 to the editing state display region 510. Also, based on a touch input applied to the first editing key 411a among the editing keys 411, the controller 180 controls the touch screen 151 to output the fourth word 504 to the first output window 320 of the first execution screen 301.

The controller 180 extracts a first recommendation word 302 related to the fourth word 504 output to the first output window 320, and controls the touch screen 151 to output the extracted first recommendation word 302 to the input region 410. The virtual keyboard on the input region 410 and the first recommendation word 302 may be output to overlap each other in a semi-transparent form. The first recommendation word 302 may be a word to be substituted to correct the fourth word 504 when the fourth word 504 is misspelled or may be a sentence to replace the fourth word 504 according to a result of analyzing the sentence output to the first output window 320.

Referring to FIG. 9B(b), the controller 180 controls the touch screen 151 to output the fourth word 504 to the editing state display region 510 based on a touch input applied to the input region 410. Also, the controller 180 controls the touch screen 151 to output seventh and eighth recommendation words 535a and 535b related to the fourth word 504. The seventh and eighth recommendation words 535a and 535b may be output on both sides of the fourth word 504 in the editing state display region 510.

Also, the controller 180 controls the touch screen 151 to output a second recommendation word 303 with respect to the fourth word 504 to the input region 410. In this instance, when a touch input is applied to the first editing key 411a, the fourth word 504 is output to the output region 310. Meanwhile, when a different type touch input from the touch input applied to the first editing key 411a is applied to the second recommendation word 303, the controller 180 controls the touch screen 151 to output the second recommendation word 303 to which the touch input has been applied, to the output region 310.

Figure 9C:
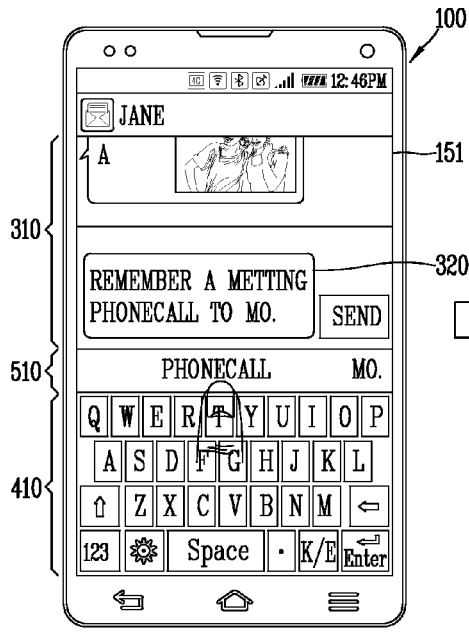
Figure 9C:
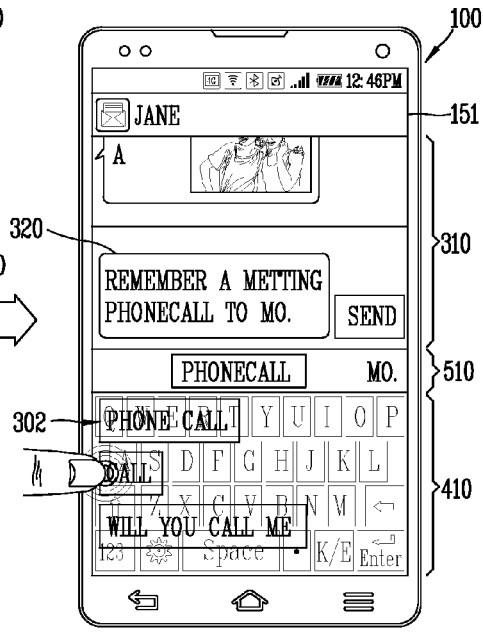
Figure 9C:
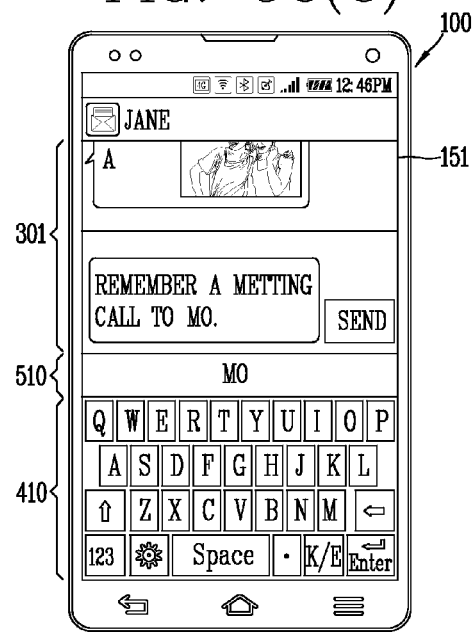

A control method of selectively outputting an input word and a recommendation word to an output region will be described with reference to FIGS. 9C(a) to 9C(c). Referring to FIG. 9C(a), when a plurality of words are output to the first output window 320, the controller 180 controls the touch screen 151 to output misspelled words (PHONECALL, MO.) to the editing state display region 510.

When a touch input is applied to the word output to the editing state display region 510, the control unit controls the touch screen 151 to output a second recommendation word 302 related to the selected word to the input region 410. The second recommendation word 302 and the virtual keyboard may be output to overlap each other in a semi-transparent state in the input region 410.

When the second recommendation word 302 and the virtual keyboard are output together, the controller 180 can edit the word output to the first output window 320 or additionally output a word to the first output window 320 based on a first touch input applied to the input region.

However, when a second touch differentiated from the first touch input is applied to the second recommendation word 302, the controller 180 controls the touch screen 151 to output the second recommendation word 302 to the first window output 320. Here, the second touch input may be a long touch input applied for a preset period of time. Accordingly, when an erroneous word is input to the output region, the user can have an opportunity to correct the word. Thus, the user can easily correct an already output word, without having to check again the output region.

Figure 9D:
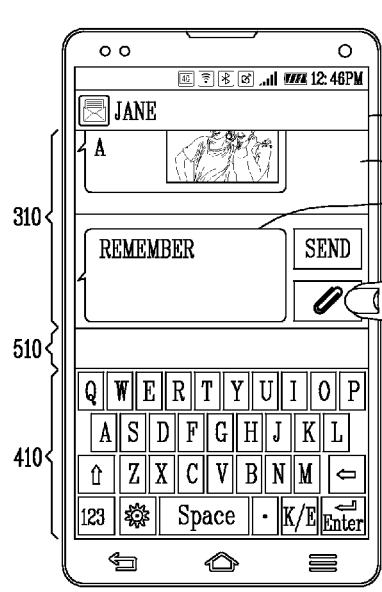
Figure 9D:
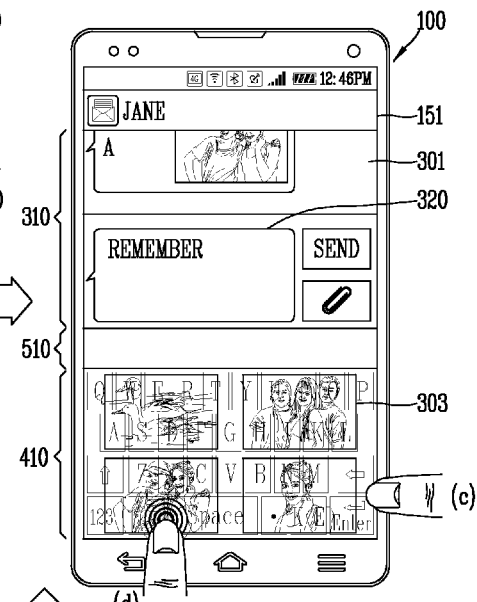
Figure 9D:
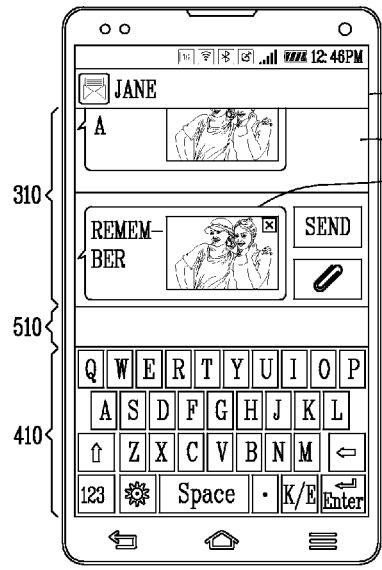
Figure 9D:
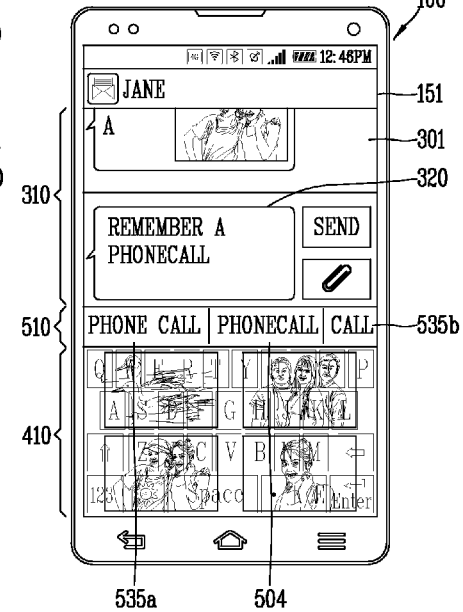

A control method of outputting a second execution screen for adding content will be described with reference to FIGS. 9D(a) to 9D(d). Referring FIG. 9D(a), the first execution screen 301 includes an icon for adding content to be sent together. The controller 180 executes a preset application based on a touch input applied to the icon. The application may be a media application including content, or the like.

The controller 180 controls the touch screen 151 to output the second execution screen 304 of the application to the input region 410. The second execution screen 304 and the virtual keyboard may overlap each other in a semi-transparent state.

Based on a touch input applied to the input region 410, the controller 180 controls the touch screen 151 to output a word to the first output window 320. Also, when a second touch input is applied to the input region 410, the controller 180 can select at least one content from the second execution screen 304. The first and second touch inputs are differentiated, and the second touch input may be a long touch input.

The controller 180 controls the touch screen 151 to output an image corresponding to selected content to the first output window 320. According to the present embodiment, the user does not need to additionally output an execution screen of the application for adding content.

Figure 10A:
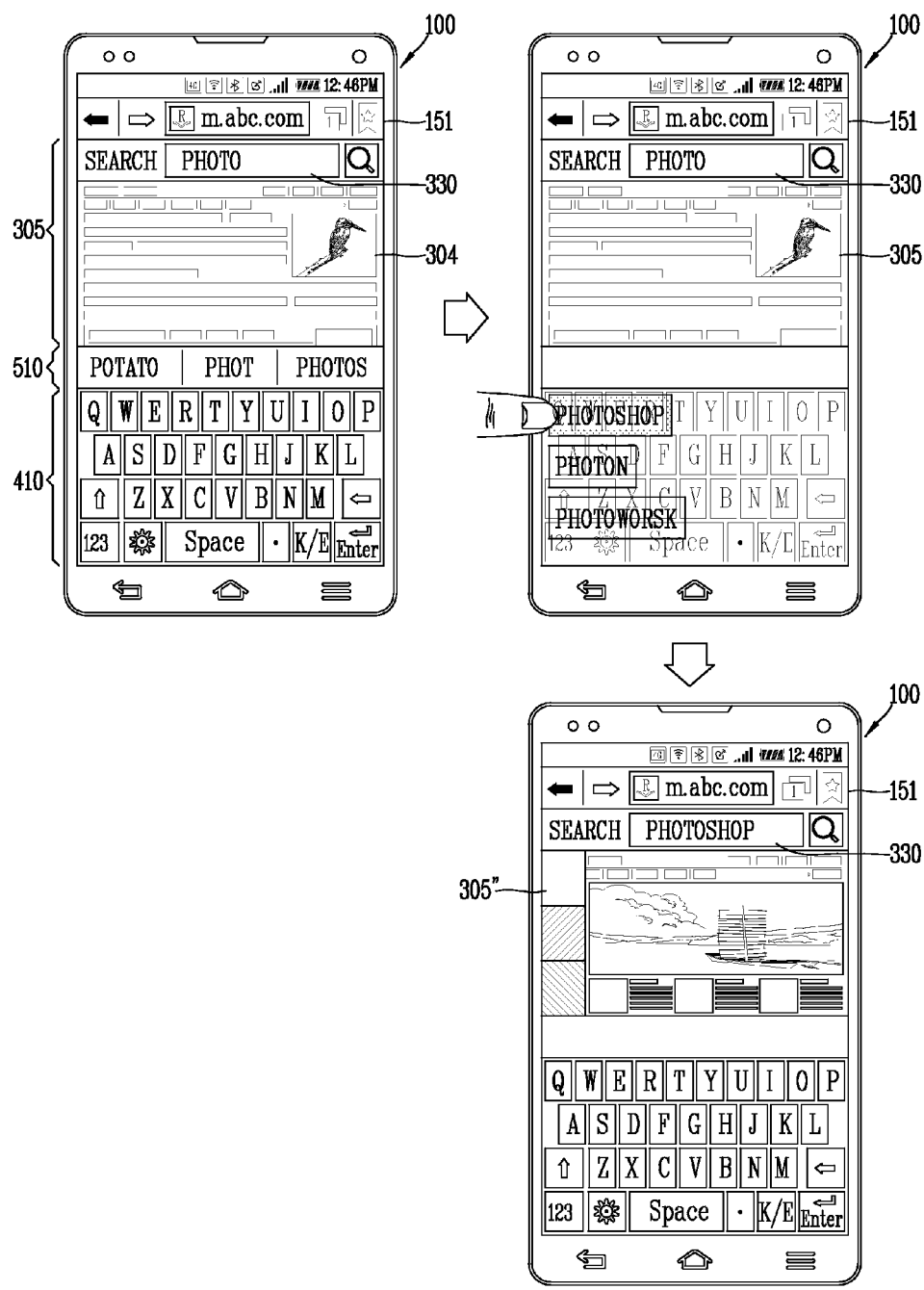
FIGS. 10A through 10C(b) are conceptual views illustrating a control method using screen information output to an input region.
Figure 10B:
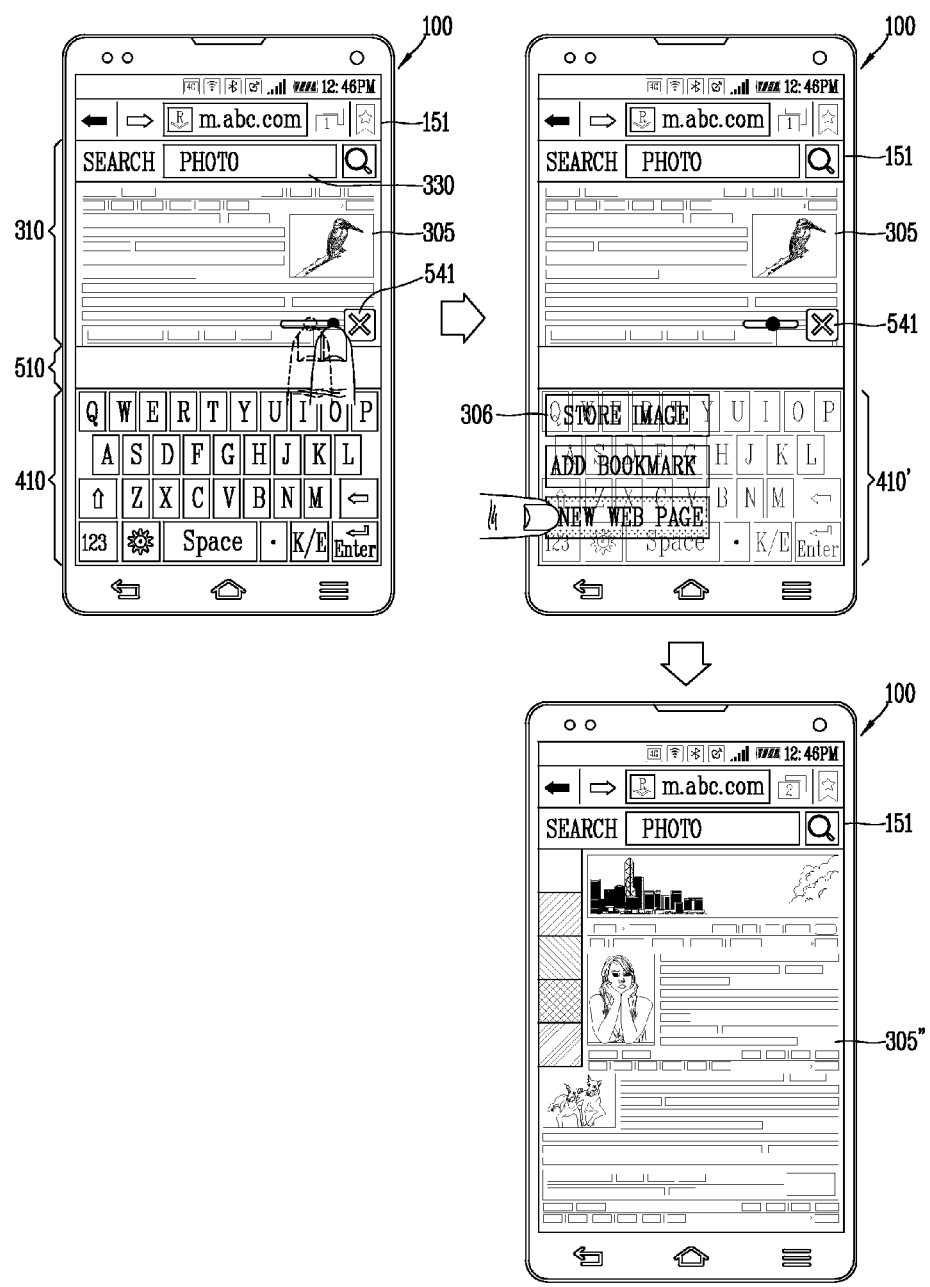
Figure 10C:
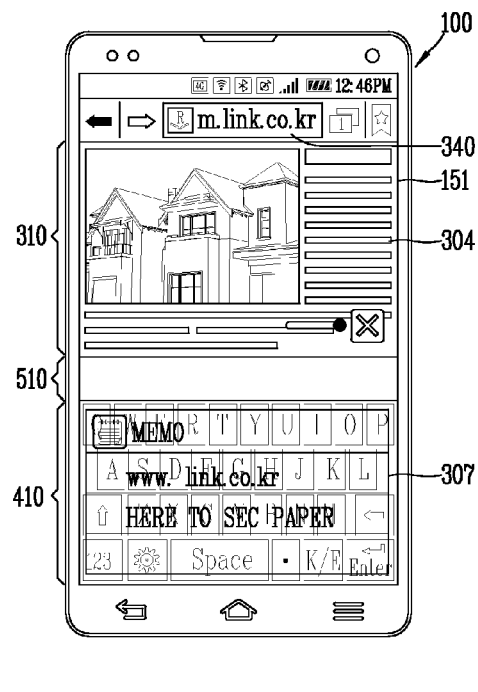
Figure 10C:
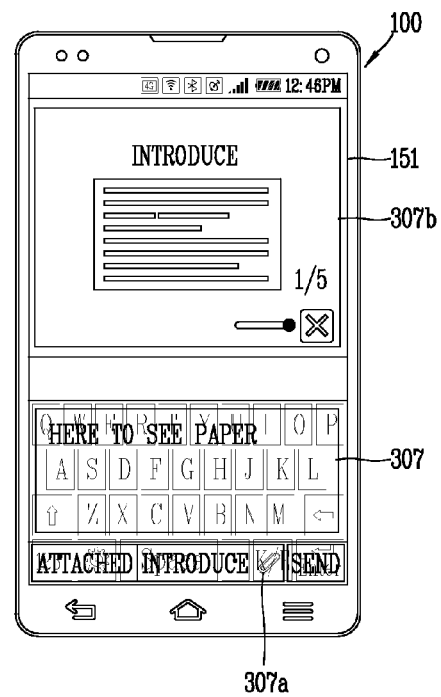

FIGS. 10A through 10C(b) are conceptual views illustrating a control method using screen information output to an input region. Referring to FIG. 10A, the touch screen 151 outputs the editing state display region 510 between a third execution screen 305 and the input region 410. For example, the third execution screen 305 may be a Web page including a second output window 330. The second output window 330 may be a search window in which a search word is output.

Based on a touch input applied to the input region 410, the controller 180 controls the touch screen 151 to output a word and a recommendation word related to the word to the editing state display region 510. When the word (or the related recommendation word) is displayed on the second output window 330, the controller 180 recognizes the word as a search word and controls the touch screen 151 to output at least one recommendation search word related to the word too the input region 410. The recommendation search word may be output in a semi-transparent state together with the virtual keyboard.

When a second touch input is applied to the recommendation search word, the controller 180 controls the touch screen 151 to output a search result screen 305' using the recommendation search word as a search word. That is, the recommendation search word is output such that it does not cover the third execution screen 305.

Referring to FIG. 10B, when a word is input to the second output window 330, the controller 180 controls the touch screen 151 to output a second graphic image 541. Based on a touch input applied to the second graphic image 541, the controller 180 can adjust transparency of the input region 410.

Also, based on a touch input applied to the second graphic image 541, the controller 180 adjusts the virtual keyboard to become gradually transparent, and controls the touch screen 151 to output a function icon 306 for controlling the application to the input region 410. For example, the function icon 306 may correspond to a control command for storing an image output to the Web page in the memory 170 or storing an address of the Web page or outputting a search result to a new page.

For example, based on a second touch input applied to the function icon 306, the controller 180 can execute a corresponding function. The second touch input may be a long touch input differentiated from the first touch input.

A control method of outputting sub-information of added content to an output region will be described with reference to FIGS. 10C(a) and 10C(b). Referring to FIG. 10C(a), the touch screen 151 outputs the second execution screen 304 to the output region 310 and outputs a fourth execution screen 307 together with the virtual keyboard to the input region 410. That is, the user can be provided with the virtual key board and the fourth execution screen 307 in the input region 410.

For example, the fourth execution screen 307 may be an execution screen of a memo application including characters. In this instance, the user can input a word to the Web page, while viewing previously stored words. That is, the user does not need to copy a word or execute an application separately.

Referring to FIG. 10C(b), the fourth execution screen 307 is output together with the keyboard to the input region, and the fourth execution screen 307 includes an image 307a of an attached file. For example, the fourth execution screen 307 may be a screen of creating an e-mail. Also, the controller 180 controls the touch screen 151 to output the sub-information 307a of the attached file.

Figure 11A:
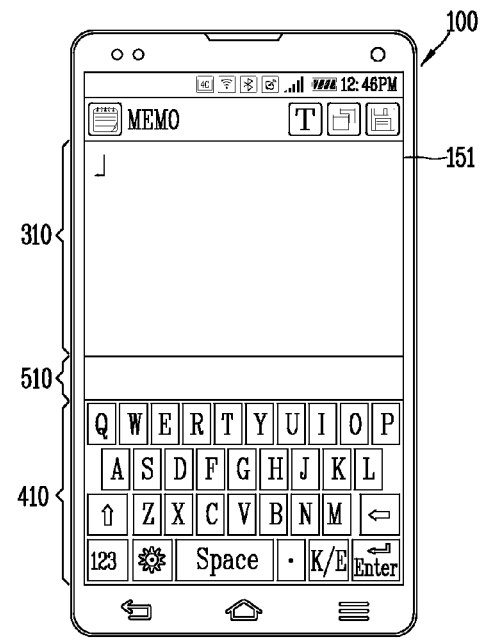
FIGS. 11A (a) to 11B(b) are conceptual views illustrating a control method of changing a size of a virtual keyboard according to an input state of a user.
Figure 11A:
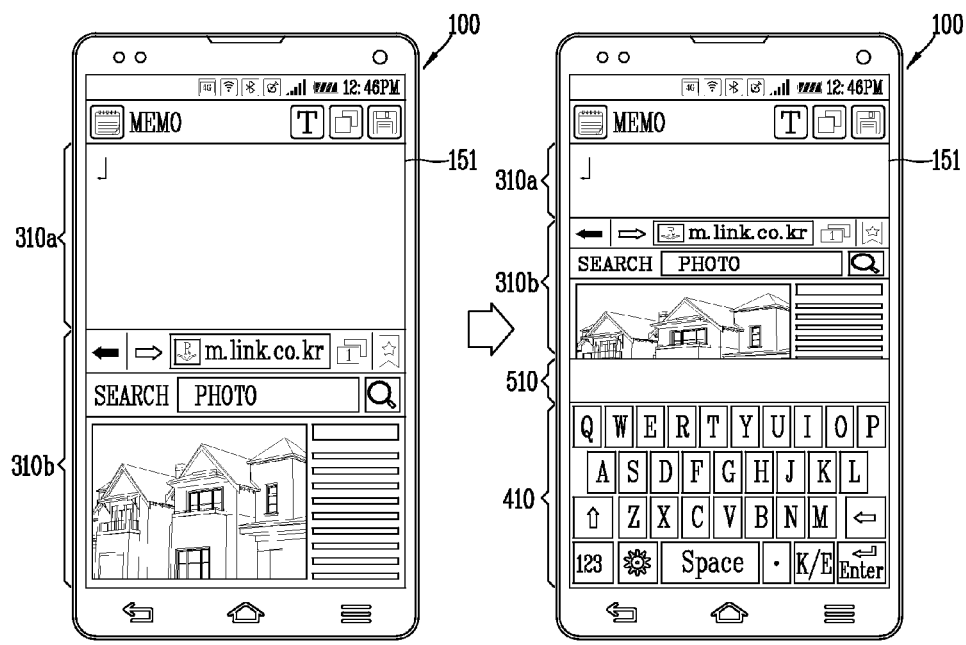

FIGS. 11A(a) to 11B(b) are conceptual views illustrating a control method of changing a size of a virtual keyboard according to an input state of a user. A control method of changing a size of a virtual keyboard according to a user's input state will be described with reference to FIGS. 11A(a) to 11B(b).

Referring to FIG. 11A(a), the touch screen 151 outputs the input region 410, the output region 310, and the editing state display region 510. Referring to FIG. 11A(b), the touch screen 151 outputs first and second screen information 310a and 310b of different applications. Based on a touch input applied to any one of the first and second screen information 310a and 310b, the controller 180 outputs the input region 410 together with the first and second screen information 310a and 310b. Also, the controller 180 controls the touch screen 151 to output the editing state display region 510 such that it is adjacent to the input region 410.

In this instance, the size of the input region FIG. 11A(b) is formed to be smaller than the input region of FIG. 11A(a). That is, a length of the input region 410 illustrated in FIG. 11A(b) in the mobile terminal in a length direction is reduced. Accordingly, the user can apply a touch input to the virtual keyboard, while simultaneously checking the first and second screen information 310a and 310b.

Figure 11B:
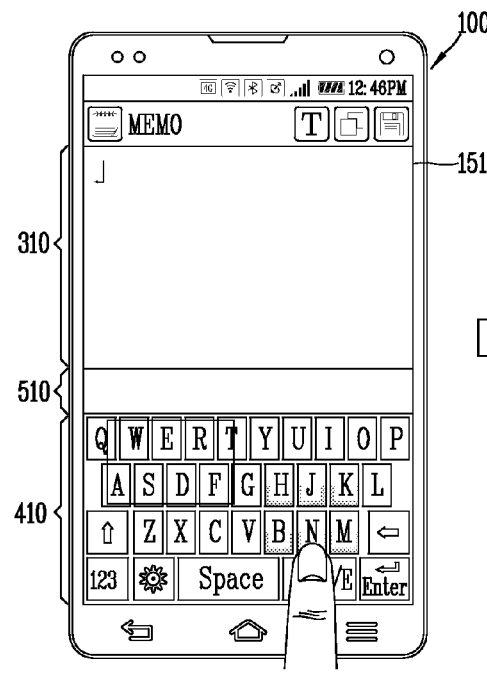
Figure 11B:
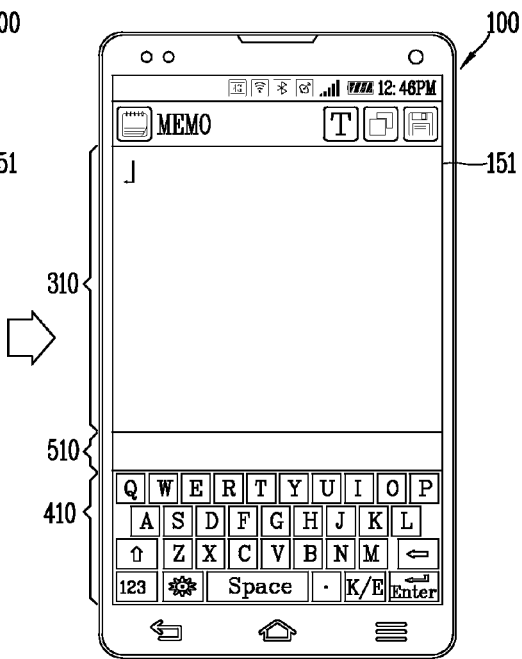

A control method of adjusting a size of the input region by sensing a region touched by the user will be described with reference to FIGS. 11B(a) and 11B(b). The controller 180 senses a region of a touch input applied to the differentiated keys of the virtual keyboard. For example, when a touch input applied by the user to a lower end portion of each key is frequently sensed, the controller 180 can control the touch screen 151 to reduce the length of the input region 410. That is, by sensing an applied touch input, the controller 180 can increase or decrease the input region 410 to allow the user to easily input characters, or the like.

Figure 12A:
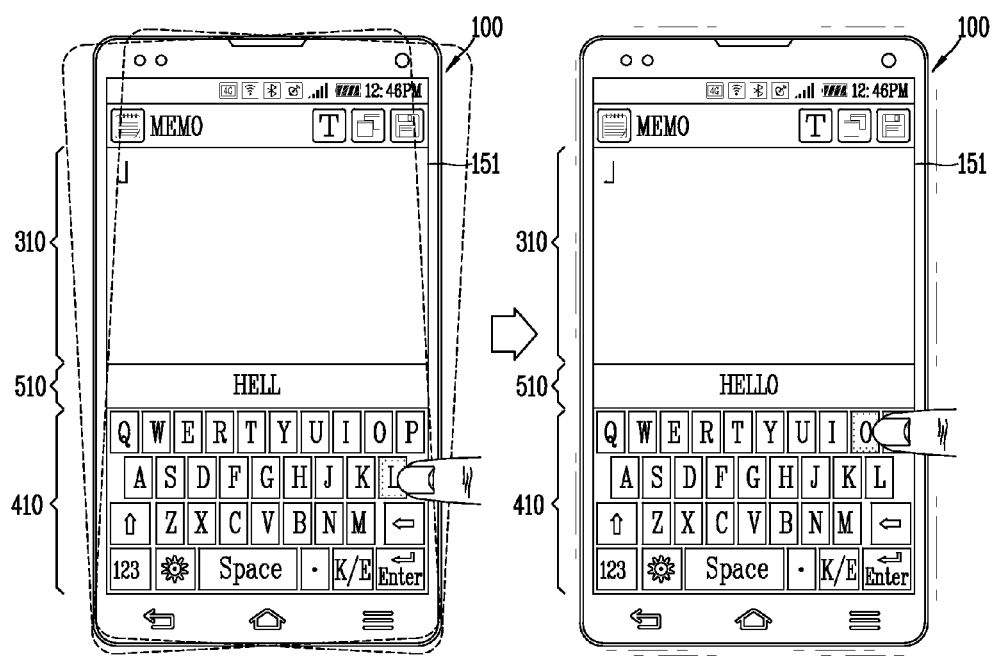
FIGS. 12A and 12B are conceptual views illustrating a control method of outputting notification information based on a touch input applied to an input region.
Figure 12B:
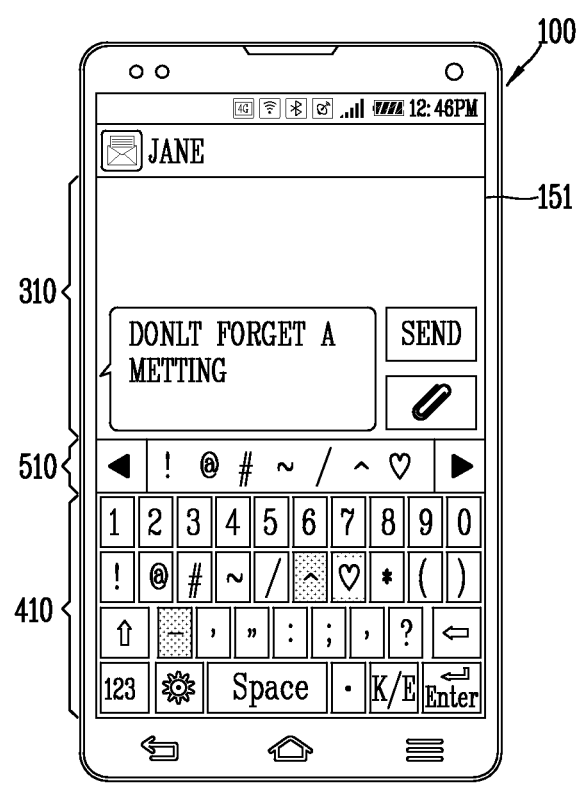

FIGS. 12A and 12B are conceptual views illustrating a control method of outputting notification information based on a touch input applied to an input region. A control method of outputting notification information based on a touch input applied to an input region will be described with reference to FIGS. 12A and 12B.

A control method of outputting vibrations of differentiated patterns corresponding to a character key and an editing key based on a touch input applied to the input region 410 will be described with reference to FIG. 12A. That is, the controller 180 can match different vibration patterns to a plurality of keys forming the virtual keyboard and control the haptic module 153 to output a vibration pattern corresponding to a key to which a touch input is applied. Thus, the user can recognize a touched key and an input character without having to accurately viewing the touch screen 151.

A control method of outputting differently shapes of character keys forming the virtual keyboard by using history information of a touch input applied by the user will be described with reference to FIG. 12B. The controller 180 can control the memory 170 to store the number of touch inputs applied to each character key. Thus, the controller 180 can output each key of the virtual keyboard in a form corresponding to the number of touch inputs. Here, the different forms may include a color, size, an image such as flickering, and the like. Accordingly, the user can easily find a frequently used key.

Figure 13A:
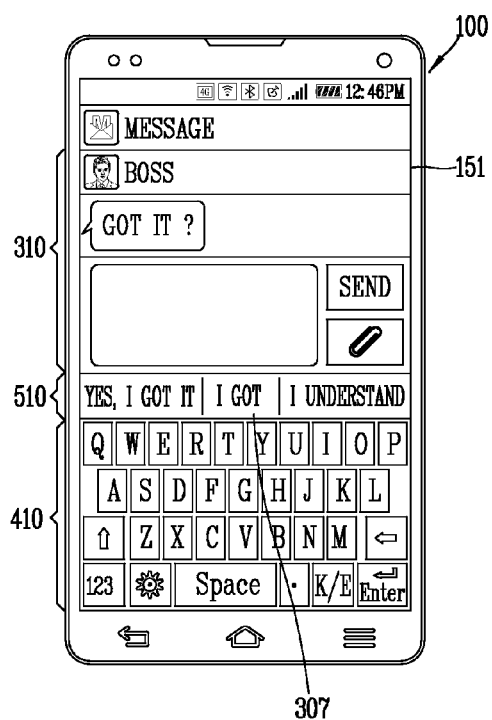
FIGS. 13(a) and 13(b) are conceptual views illustrating a control method of analyzing information included in an input region and outputting a recommendation word.
Figure 13B:
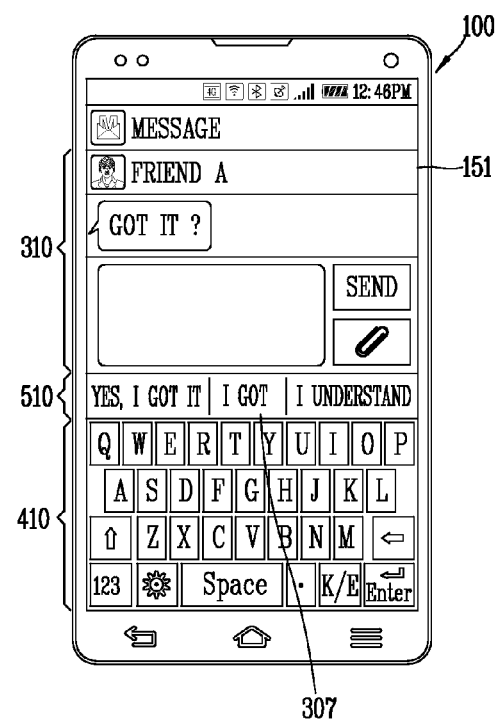

FIGS. 13(a) and 13(b) is a conceptual view illustrating a control method of analyzing information included in an input region and outputting a recommendation word. The information included in the input region may include a type of an executed application, a type of a document based on contents and format of text (words, or characters) already output to the input region 410, information regarding a target to receive characters, and the like.

For example, when an execution screen of a message application is output to the input region 410, a name of a recipient to which the message is to be sent may be included in the execution screen. When a word is input, the controller 180 can control the touch screen 151 to output a recommendation word using information regarding the recipient to the editing state display region 510.

For example, when a word "got it?" is input, whether to output an honorific title is to be output based on the information regarding the recipient may be determined. Accordingly, the user can quickly input a desired word by using the recommendation word output to the editing state display region 510.

According to embodiments of the present invention, since an editing state display region positioned to be adjacent to the input region and outputting a word based on a touch input applied to the input region is output, the user can immediately check a word output based on the touch input without moving his or her eyes to the output region.

Also, since the display unit outputs different visual information according to an edited state of the word, an editing state according to the user's touch input can be checked. In addition, since a plurality of content items for inputting the word are output to overlap the virtual keyboard, there is no need to change the current page to check additional screen information.

The mobile terminal according to the embodiments of the present invention is not limited in its application of the configurations and methods, but the entirety or a portion of the embodiments may selectively be combined to be configured into various modifications.

The foregoing embodiments and advantages are merely and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a wireless communication unit configured to provide wireless communication;
a touch screen; and
a controller configured to:
display on the touch screen an input region including a plurality of character keys corresponding to words and a plurality of editing keys for editing displayed words and an output region,
display on the touch screen an editing state display region between the input region and the output region,
display a word corresponding to touched character keys on the editing state display region,
display the word on the output region while applying a touch input to the character keys, and
edit the word displayed in the editing state display region based on a touch input applied to the input region,
wherein the plurality of editing keys include a first editing key,
wherein in response to receiving a first touch to the first editing key, the controller is further configured to output first visual information which is an animation of the word moving from the editing state display region to the output region and gradually decreasing in size according to a passage of time, and
wherein the controller is further configured to:
in response to a predetermined touch input applied to the editing state display region, move a cursor that has been displayed on the output region to a designated position between characters within the editing state display region for additional editing,
control the touch screen to display second visual information indicating a current editing state to an edge of the editing state display region during the additional editing for adding a new character between characters of the word,
when a third touch as a long touch input is applied to a second editing key, switch the input region to a keypad region, wherein when the keypad region is activated, the touch screen outputs a keyboard in the input region as a semi-transparent image and receiving of any touch input applied to the plurality of character keys is limited,
control the touch screen to output the second visual information to the editing state display region,
select a portion of the word, based on a fourth touch continuously applied with the third touch, and
when the third touch is released, control the touch screen to delete the selected portion of the word, switch the keypad region to the input region and control the touch screen to limit outputting of the second visual information.

2. The mobile terminal of claim 1, wherein the controller is further configured to:
activate the input region to a keypad mode based on the particular touch applied to the first editing key in which the second touch is different from the first touch, and
change an input position for inputting the word in the editing state display region based on the particular touch input applied to the input region.

3. The mobile terminal of claim 2, wherein the controller is further configured to display a cursor indicating an input position in the editing state display region based on the second touch.

4. The mobile terminal of claim 2, wherein when a plurality of rows of words are displayed in the output region, the controller is further configured to select a row of a word in which the input position is to be designated based on the second touch.

5. The mobile terminal of claim 2, wherein the controller is further configured to ignore a touch input applied to a corresponding character key in the keypad mode.

6. The mobile terminal of claim 5, wherein when the keypad mode is activated, the controller is further configured to change a transparency of the input region.

7. The mobile terminal of claim 2, wherein in the keypad mode, the controller is further configured to display a handwriting window on the touch screen for receiving a handwriting input based on a continuous touch input in the input region.

8. The mobile terminal of claim 2, wherein the plurality of editing keys further include a second editing key for deleting the word in the editing state display region, and
wherein the controller is further configured to select a portion of a plurality of characters of the word based on the particular touch applied to the second editing key, and delete the selected portion of the plurality of characters in response to a release of the particular touch applied to the second editing key and control the touch screen to output third visual information to the editing state display region indicating a state for deleting the selected portion of the plurality of characters.

9. The mobile terminal of claim 8, wherein the second visual information has a preset shape and color of the editing state display region differentiated from the third visual information.

10. The mobile terminal of claim 1, wherein the output region corresponds to an execution screen of an application including a plurality of content items, and
wherein the controller is further configured to:
display at least a portion of the plurality of content items on the input region based on a touch input applied to the execution screen, and
adjust a transparency of the plurality of character keys and the plurality of editing keys.

11. The mobile terminal of claim 10, wherein the controller is further configured to display a graphic image related to the content items on the input region for controlling the application.

12. A method of controlling a mobile terminal, the method comprising:
displaying, via a touch screen of the mobile terminal, an input region including a plurality of character keys and a plurality of editing keys and an output region, wherein the plurality of editing keys include a first editing key;
displaying on the touch screen an editing state display region between the input region and the output region;
displaying a word corresponding to touched character keys on the editing state display region;
editing, via a controller of the mobile terminal, the word displayed in the editing state display region based on a touch input applied to the input region;
displaying the edited word on the output region while editing the word in the editing state display region;
in response to receiving a first touch to the first editing key of the plurality of editing keys, outputting first visual information which is an animation of the word moving from the editing state display region to the output region and gradually decreasing in size according to a passage of time;
in response to a predetermined touch input applied to the editing state display region, moving a cursor that has been displayed on the output region to a designated position between characters within the editing state display region for additional editing;
displaying second visual information indicating a current editing state to an edge of the editing state display region during the additional editing for adding a new character between characters of the word;
when a third touch as a long touch input is applied to a second editing key, switching the input region to a keypad region, wherein when the keypad region is activated, the touch screen outputs a keyboard in the input region as a semi-transparent image and receiving of any touch input applied to the of character keys is limited;
controlling the touch screen to output the second visual information to the editing state display region;
selecting a portion of the word, based on a fourth touch continuously applied with the third touch; and
when the third touch is released, controlling the touch screen to delete the selected portion of the word,
switches the keypad region to the input region and controls the touch screen to limit outputting of the second visual information.

13. The method of claim 12, further comprising selecting a portion of a plurality of characters of the word based on the particular touch applied to a second editing key, and deleting the selected portion of the plurality of characters in response to a release of the particular touch applied to the second editing key and outputting third visual information to the editing state display region indicating a state for deleting the selected portion of the plurality of characters.

14. The method of claim 13, wherein the second visual information has a preset shape and color of the editing state display region differentiated from the third visual information.

* * * * *